(12) United States Patent
Yagnik et al.

(10) Patent No.: US 9,524,487 B1
(45) Date of Patent: Dec. 20, 2016

(54) SYSTEM AND METHODS FOR DETECTING TEMPORAL MUSIC TRENDS FROM ONLINE SERVICES

(75) Inventors: Jay Yagnik, Mountain View, CA (US); Douglas Eck, Palo Alto, CA (US)

(73) Assignee: Google Inc., Mountain View, CA (US)

(*) Notice: Subject to any disclaimer, the term of this patent is extended or adjusted under 35 U.S.C. 154(b) by 350 days.

(21) Appl. No.: 13/466,817

(22) Filed: May 8, 2012

Related U.S. Application Data

(60) Provisional application No. 61/632,823, filed on Mar. 15, 2012.

(51) Int. Cl.
| | |
|---|---|
| G06F 15/16 | (2006.01) |
| G06Q 10/10 | (2012.01) |
| G06F 17/30 | (2006.01) |
| G06Q 30/00 | (2012.01) |

(52) U.S. Cl.
CPC ........... *G06Q 10/10* (2013.01); *G06F 17/30* (2013.01); *G06Q 30/00* (2013.01)

(58) Field of Classification Search
CPC ... G06Q 10/10; H04L 29/06; H04L 29/08072; H04L 29/06027; H04L 12/581
USPC ........................................................ 709/204
See application file for complete search history.

(56) References Cited

U.S. PATENT DOCUMENTS

| | | | |
|---|---|---|---|
| 6,130,938 A | 10/2000 | Erb | |
| 6,192,119 B1 | 2/2001 | Wilson | |
| 6,681,295 B1* | 1/2004 | Root | G06F 9/30047 711/128 |
| 6,697,478 B1 | 2/2004 | Meldrum et al. | |
| 6,754,322 B1 | 6/2004 | Bushnell | |
| 7,106,848 B1 | 9/2006 | Barlow et al. | |
| 7,366,990 B2* | 4/2008 | Pitroda | G06F 3/0483 707/E17.013 |
| 7,555,110 B2 | 6/2009 | Dolan et al. | |
| 7,610,287 B1 | 10/2009 | Dean et al. | |
| 7,742,468 B2 | 6/2010 | Vagelos | |

(Continued)

FOREIGN PATENT DOCUMENTS

WO    WO02079984    10/2002

OTHER PUBLICATIONS

Adamic et al., "A Social Network Caught in the Web," Internet Journal, First Monday, Jun. 2, 2003, vol. 8, No. 6, pp. 1-22.

(Continued)

*Primary Examiner* — Farid Homayounmehr
*Assistant Examiner* — Sanchit Sarker
(74) *Attorney, Agent, or Firm* — Patent Law Works LLP

(57) ABSTRACT

A system and methods for automatically detecting temporal music trends by observing music consumption by users of online services, for example, social networks, and user sharing habits. In some embodiments, the system and methods gather music consumption patterns (e.g., downloading, listening, sharing or the like) of users, including music identifiers for a track, album, or playlist in a user's music library and time stamps that indicate consumption times corresponding to the music identifiers. A temporal trends detection engine determines music of interest to users by analyzing music consumption patterns of users, user interests and tastes in music, and social affinity between users. A recommendations engine automatically generates and transmits recommendations of music determined by the temporal trends detection engine to be of interest to users.

15 Claims, 15 Drawing Sheets

(56) References Cited

U.S. PATENT DOCUMENTS

| | | | |
|---|---|---|---|
| 2002/0137490 A1* | 9/2002 | Gallant | G06Q 20/102 455/411 |
| 2002/0143874 A1 | 10/2002 | Marquette et al. | |
| 2003/0061105 A1* | 3/2003 | Morris | G06Q 30/02 705/26.8 |
| 2003/0106058 A1* | 6/2003 | Zimmerman | H04N 7/163 725/46 |
| 2003/0229537 A1* | 12/2003 | Dunning | G06F 17/30017 705/26.7 |
| 2004/0258220 A1 | 12/2004 | Levine et al. | |
| 2005/0060240 A1* | 3/2005 | Popofsky | G06Q 30/0601 705/26.1 |
| 2005/0098023 A1* | 5/2005 | Toivonen | G10H 1/0058 84/615 |
| 2005/0152521 A1 | 7/2005 | Liljestrand | |
| 2005/0288991 A1* | 12/2005 | Hubbard | G06Q 30/02 705/7.29 |
| 2006/0026288 A1 | 2/2006 | Acharya et al. | |
| 2006/0077957 A1 | 4/2006 | Reddy et al. | |
| 2006/0143236 A1* | 6/2006 | Wu | G06F 17/30053 |
| 2006/0206604 A1 | 9/2006 | O'Neil et al. | |
| 2007/0127631 A1 | 6/2007 | Difiglia | |
| 2007/0171898 A1 | 7/2007 | Salva | |
| 2007/0173236 A1 | 7/2007 | Vishwanathan et al. | |
| 2007/0248077 A1 | 10/2007 | Mahle, Jr. et al. | |
| 2008/0056475 A1 | 3/2008 | Brannick et al. | |
| 2008/0192656 A1 | 8/2008 | Vagelos | |
| 2009/0083117 A1* | 3/2009 | Svendsen | G06F 17/30209 709/205 |
| 2009/0106307 A1* | 4/2009 | Spivack | G06Q 30/02 |
| 2009/0158342 A1* | 6/2009 | Mercer | G06Q 30/02 725/46 |
| 2009/0164516 A1* | 6/2009 | Svendsen | G06F 17/30041 |
| 2009/0251277 A1* | 10/2009 | O'Hara | G06Q 30/02 340/5.1 |
| 2010/0198880 A1* | 8/2010 | Petersen | H04H 20/57 707/803 |
| 2010/0235328 A1* | 9/2010 | Sukanen | G06F 17/30032 707/665 |
| 2010/0241699 A1* | 9/2010 | Muthukumarasamy | G06F 17/30035 709/203 |
| 2010/0262658 A1* | 10/2010 | Mesnage | G06Q 10/06 709/204 |
| 2010/0318527 A1* | 12/2010 | Nandy | G06F 3/0484 707/754 |
| 2010/0332570 A1* | 12/2010 | Roberts | G06F 17/30029 707/912 |
| 2011/0098156 A1 | 4/2011 | Ng et al. | |
| 2011/0137994 A1* | 6/2011 | Kumar | G06Q 10/02 709/204 |
| 2011/0246572 A1* | 10/2011 | Kollenkark | H04N 21/4755 709/204 |
| 2011/0300834 A1* | 12/2011 | Ni | G06Q 30/02 455/414.1 |
| 2012/0005479 A1* | 1/2012 | Young | G06F 11/1004 713/168 |
| 2012/0072418 A1* | 3/2012 | Svendsen | G06F 17/30749 707/724 |
| 2012/0159337 A1* | 6/2012 | Travilla | G06Q 30/0631 715/738 |
| 2012/0192258 A1* | 7/2012 | Spencer | H04W 12/06 726/7 |
| 2012/0221687 A1* | 8/2012 | Hunter | G06F 17/30029 709/219 |
| 2012/0284012 A1* | 11/2012 | Rodriguez | G06Q 30/06 704/1 |
| 2013/0097101 A1* | 4/2013 | Ortiz | G06Q 30/02 706/11 |
| 2013/0125172 A1* | 5/2013 | Suh | H04L 51/32 725/46 |
| 2013/0246186 A1* | 9/2013 | Chang | G06Q 50/01 705/14.66 |
| 2013/0346877 A1* | 12/2013 | Borovoy | H04L 65/403 715/753 |

OTHER PUBLICATIONS

Agarwal et al., "Enabling Real-Time User Interests for Next Generation Activity-Oriented Social Networks," Thesis submitted to the Indian Institute of Technology Delhi, Department of Computer Science & Engineering, 2005, 70 pgs.

Anwar et al., "Leveraging 'Social-Network' Infrastructure to Improve Peer-to Peer Overlay Performance: Results from Orkut," University of Illinois at Urbana-Champaign USA, 2005, 9 pgs.

AT&T Personal Reach Service: Benefits and Features, Mar. 29, 2010, 7 pgs.

AT&T Personal Reach Service: Personal Reach Service, Mar. 29, 2010, 2 pgs.

Baird et al., "Neomillennial User Experience Design Strategies: Utilizing Social Networking Media to Support "Always On" Learning Styles," J. Educational Technology Systems, vol. 34(1), 2005-2006, Baywood Publishing Co., Inc., pp. 5-32.

Boyd, et al., "Social Network Sites: Definition, History, and Scholarship," Journal of Computer-Mediated Communication, International Communication Association, 2008, pp. 210-230.

Churchill et al., "Social Networks and Social Networking," IEEE Computer Society, Sep.-Oct. 2005, pp. 14-19.

Cohen et al., "Social Networks for Creative Collaboration," C&C '05, Apr. 12-15, 2005, London, United Kingdom, pp. 252-255.

Decker et al., "The Social Semantic Desktop," Digital Enterprise Research Institute, DERI Galway, Ireland, DERI Innsbruck, Austria, DERI Technical Report, May 2, 2004, 7 pgs.

Dukes-Schlossberg et al., "Battlefield Awareness and Data Dissemination Intelligent Information Dissemination Server," Air Force Research Laboratory, Rome Research Site, Rome, NY, Nov. 1, 1999, 31 pgs.

Eagle et al., "Social Serendipity: Proximity Sensing and Cueing," MIT Media Laboratory Technical Note 580, May 2004, 18 pgs.

Erickson et al., "Social Translucence: Using Minimalist Visualizations of Social Activity to Support Collective Interaction," Designing Information Spaces: The Social Navigation Approach, Springer-verlag: London, 2003, pp. 1-19.

Gross et al., "Information Revelation and Privacy in Online Social Networks," WPES '05, Alexandria, Virginia, Nov. 7, 2005, pp. 71-80.

Hammond et al., "Social Bookmarking Tools (I)," D-Lib Magazine, Apr. 2005, vol. II, No. 4, ISSN 1082-9873, 23 pgs.

Heer et al., "Vizster: Visualizing Online Social Networks," University of California, Berkeley, Oct. 23, 2005, 8 pgs.

International Search Report, International Application No. PCT/US2008/005118, Sep. 30, 2008, 2 pgs.

Leonard, "You Are Who You Know," Internet, retrieved at http://www.salon.com, Jun. 15, 2004, 15 pgs.

LiveJournal, "FAQ #163: How Do I Find a Syndicated Account?" Last Updated: thebubba, Jan. 6, 2004, 2 pgs.

Marwick, "Selling Your Self: Online Identity in the Age of a Commodified Internet," University of Washington, 2005, 192 pgs.

MediaSift Ltd., DataSift: Realtime Social Data Mining Platform, Curate and Data Mine the Real Time Web with DataSift, Dedipower, Managed Hosting, [Retrieved on May 13, 2011], 1 pg.

Metcalf et al., "Spatial Dynamics of Social Network Evolution," 23rd International Conference of the System Dynamics Society, Jul. 19, 2005, pp. 1-13.

Mori et al., "Real-world Oriented Information Sharing Using Social Networks," Group '05, Sanibel Island, Florida, USA, Nov. 6-9, 2005, pp. 81-84.

Nardi et al., "Blogging as Social Activity, or, Would You Let 900 Million People Read Your Diary?" CSCW'04, Nov. 6-10, 2004, vol. 6, Issue 3, Chicago, Illinois, pp. 222-231.

(56) References Cited

OTHER PUBLICATIONS

Neumann et al., "Semantic social network portal for collaborative online communities," Journal of European Industrial Training, 2005, Emerald Group Publishing, Limited, vol. 29, No. 6, pp. 472-487.

O'Murchu et al., "Online Social and Business Networking Communities," Digital Enterprise Research Institute DERI Technical Report, National University of Ireland, Aug. 11, 2004, 22 pgs.

Ring Central, Inc., Internet, retrieved at http://www.ringcentral.com, Apr. 19, 2007, 1 pg.

Singh et al., "Cinema: Columbia InterNet Extensible Multimedia Architecture," Department of Computer Science, Columbia University, May 2002, pp. 1-83.

Steen et al., "Development of we-centric, context-aware, adaptive mobile services requires empathy and dialogue," Freeband FRUX, Oct. 17, 2005, Internet Journal, Netherlands, pp. 1-4.

Superfeedr Track, Internet, retrieved at http://blog.superfeedr.com/track/filter/xmpp/pubsubhubbub/track, May 13, 2011, 8 pgs.

Twitter Blog: Tracking Twitter, Internet, retrieved at http://blog.twitter.com/2007/09/tracking-twitter.html, May 13, 2011, 2 pgs.

Twitter Announces Fire Hose Marketplace: Up to 10K Keyword Filters for 30 Cents, Internet, retrieved at http://www.readywriteweb.com/archives/twitter_announces_fire_hose_marketplace_up_to_10k.php, May 13, 2011, 7 pgs.

Van Eijk et al., "We-centric, context-aware, adaptive mobile service bundles," Freeband, Telematica Instituut, TNO telecom, Nov. 30, 2004, 48 pgs.

Wenger et al., "Technology for Communities," CEFRIO Book Chapter v 5.2, Jan. 18, 2005, pp. 1-15.

\* cited by examiner

Social Graph (Showing Examples of User Music Consumption)

EXAMPLE A – Matrix Showing
Relationship Strength Between Users

| User 132a-132h | User 132a | User 132b | User 132c | User 132d | User 132e | User 132f | User 132g | User 132h |
|---|---|---|---|---|---|---|---|---|
| 132a | (a,a) - | (a,b) 0 | (a,c) 4 | (a,d) 2 | (a,e) 0 | (a,f) 0 | (a,g) 0 | (a,h) 0 |
| 132b | (b,a) 0 | (b,b) - | (b,c) 0 | (b,d) 0 | (b,e) 0 | (b,f) 0 | (b,g) 0 | (b,h) 0 |
| 132c | (c,a) 4 | (c,b) 0 | (c,c) - | (c,d) 4 | (c,e) 0 | (c,f) 0 | (c,g) 0 | (c,h) 0 |
| 132d | (d,a) 2 | (d,b) 0 | (d,c) 4 | (d,d) - | (d,e) 0 | (d,f) 0 | (d,g) 0 | (d,h) 0 |
| 132e | (e,a) 0 | (e,b) 0 | (e,c) 0 | (e,d) 0 | (e,e) - | (e,f) 5 | (e,g) 5 | (e,h) 5 |
| 132f | (f,a) 0 | (f,b) 0 | (f,c) 0 | (f,d) 0 | (f,e) 5 | (f,f) - | (f,g) 5 | (f,h) 5 |
| 132g | (g,a) 0 | (g,b) 0 | (g,c) 0 | (g,d) 0 | (g,e) 5 | (g,f) 5 | (g,g) - | (g,h) 5 |
| 132h | (h,a) 0 | (h,b) 0 | (h,c) 0 | (h,d) 0 | (h,e) 5 | (h,f) 5 | (h,g) 5 | (h,h) - |

| Relationship Strength Assessment Index (Affinity Code) |
|---|
| 0 – no relationship |
| 1 – barely known |
| 2 – acquaintance |
| 3 – similar interest (e.g. music preferences based on music classifications of classical, rock, jazz, blues, etc.) |
| 4 – work together |
| 5 – friends |

Figure 6

EXAMPLE B – Matrix Showing
Relationship Strength Between Users

| User 132a-132h | User 132a | User 132b | User 132c | User 132d | User 132e | User 132f | User 132g | User 132h |
|---|---|---|---|---|---|---|---|---|
| 132a | (a,a) - | (a,b) 0 | (a,c) 1 | (a,d) 1 | (a,e) 0 | (a,f) 0 | (a,g) 0 | (a,h) 0 |
| 132b | (b,a) 0 | (b,b) - | (b,c) 1 | (b,d) 1 | (b,e) 0 | (b,f) 0 | (b,g) 0 | (b,h) 0 |
| 132c | (c,a) 1 | (c,b) 0 | (c,c) - | (c,d) 1 | (c,e) 0 | (c,f) 0 | (c,g) 0 | (c,h) 0 |
| 132d | (d,a) 1 | (d,b) 0 | (d,c) 1 | (d,d) - | (d,e) 0 | (d,f) 0 | (d,g) 0 | (d,h) 0 |
| 132e | (e,a) 0 | (e,b) 0 | (e,c) 0 | (e,d) 0 | (e,e) - | (e,f) 1 | (e,g) 1 | (e,h) 1 |
| 132f | (f,a) 0 | (f,b) 0 | (f,c) 0 | (f,d) 0 | (f,e) 1 | (f,f) - | (f,g) 1 | (f,h) 1 |
| 132g | (g,a) 0 | (g,b) 0 | (g,c) 0 | (g,d) 0 | (g,e) 1 | (g,f) 1 | (g,g) - | (g,h) 1 |
| 132h | (h,a) 0 | (h,b) 0 | (h,c) 0 | (h,d) 0 | (h,e) 1 | (h,f) 1 | (h,g) 1 | (h,h) - |

700

| Relationship Strength Assessment Index (Binary Code) |
|---|
| 0 – no sharing |
| 1 – sharing |

SYSTEM AND METHODS FOR DETECTING TEMPORAL MUSIC TRENDS FROM ONLINE SERVICES

CROSS REFERENCE TO RELATED APPLICATIONS

The present application claims the benefit of priority under 35 U.S.C. §119(e) of U.S. Provisional Application No. 61/632,823 entitled "System and Methods for Detecting Temporal Music Trends from Online Services," filed on Mar. 15, 2012, by Jay Yagnik and Douglas Eck. The entire contents of the provisional application are incorporated by reference herein.

BACKGROUND

The present disclosure relates to electronic communications via online communities, for example, social networks. In particular, the present disclosure relates to a system and methods for automatically detecting temporal music trends in online communities or services and automatically generating recommendations for users of the social networks to facilitate sharing of music.

Music is a social phenomenon and people with music interests and tastes that are similar often enjoy the same music. Friends typically introduce each other to latest trends in music. With the popularity and use of electronic communications increasing dramatically in recent years, people share music with their friends and others, either by email, social networks, short message service (sms) or the like. To share music preferences by email, a person can simply identify a music link and paste it into an email to others with whom they wish to share their music interests. Alternatively, people can copy a link to a track that they enjoy or even an entire playlist and paste it into user accounts in an online community or service. Some social networks have user interfaces that are configured with buttons, for example, to designate a "share" function, to facilitate user sharing of information including music. Yet other social networks have integrated with music provision services to facilitate purchase and sharing of streaming music between users of the social networks.

Google Music offered by Google Inc., of Mountain View, Calif., is a venue to connect artists and their music directly with their fans. Users can upload their entire music libraries to Google's servers, making tunes available for streaming from any browser to Android-based devices, such as a phone, a tablet, or Google TV. Google has a streaming music service that lets consumers find, purchase, and share music and songs from record labels by entities that authorize such sharing. Google Music automatically synchronizes users' entire music libraries across all of their devices from a cloud network, so users do not have to worry about connecting cables to make uploads or downloads. Users may purchase single songs or entire albums from their computer, Android smartphone, or tablet, to instantly add them to their Google Music libraries. Yet another service offered by Google Inc., is Google Plus, which has a recommendations engine for using a friend's selections to make music discoverable. It allows friends to stream music from one another, for an entire album or share a specific track with a friend. All these service require a user's direct input to initiate any sharing of music.

With the ongoing trends in electronic communication, it would certainly be beneficial to find better ways to detect music trends and automatically generate recommendations based on them.

SUMMARY

The present disclosure overcomes the deficiencies and limitations of the prior art by providing a system and methods for automatically detecting temporal trends in music in online services, for example social networks, and automatically generating recommendations on music tracks or albums, or entire music playlists between users of the online services or communities that share an affinity. In some embodiments, the system and methods use music consumption information and sharing habits of users connected via the online services. The music consumption information includes music identifiers for a track, album, or playlist, in a user's music library and time stamps that indicate times (for example, time of day or week) at which the user consumed the music (either by downloading, listening, sharing, or the like). In addition, in some embodiments, the system and methods determine the social affinity between users to determine if they are friends or otherwise affiliated or share similar interests, for example in music. If so, in some embodiments, the system and methods further analyze the relationship strengths or sharing habits among users (for example, if they are friends) in order to generate recommendations of music between users. In some other embodiments, the system and methods determine affinity based on a particular item of music, by first determining the music type (for example, classical, rock, jazz, blues etc.) of that particular item of music and then determining users who enjoy listening to the specific music type. In these embodiments, the system and method generates recommendations only to those users who enjoy a particular music type. For example, recommendations of classical music may be recommended to a particular user, but not rock music, if the system and methods determine that the particular user only enjoys classical music.

In some embodiments, the system comprises a temporal filtering engine, which receives the time stamps and outputs a weight associated with each time stamp. The system determines the weights by using a function that decays with passage of time and determines final scores for a particular music identifier to determine the current "popular" or "hot" music. The system further comprises a current trend recommendations engine to transmit recommendations to a user or between users.

In yet other embodiments, the system comprises a predictor engine to analyze the past music consumption history of users of online services. The predictor engine obtains data to indicate, for example, a time bucket, to indicate a time at which a particular user consumed a particular track, album, or playlist. The system discretizes the time into buckets, for example, by minute, hour, or day. The system trains the predictor engine to gauge a user's consumption patterns or habits to formulate recommendations from the particular user.

One method for detecting temporal music trends in an online service, executing on one or more computing devices, comprises a) determining users of the online community that share a social affinity; b) obtaining, in a local storage, music consumption data for the users that share social affinity, wherein the music consumption data includes one or more items of music of interest to an individual user and a timestamp to indicate the time at which an item of music was consumed by the individual user, where each of the one or more items of music is identified by a unique music identifier; c) compiling a list of items of music consumed by the individual user with associated time stamps; d) sorting, using the one or more computing devices, the time stamps to determine ones that are most recent in time; e) determining from the music consumption data, one or more items of music that co-relate to the time stamps determined to be most recent in time; and f) generating recommendations to other users within the online community, with whom the user shares affinity. It should be understood that the recommendations that are generated may be from a particular user to other users with whom that particular user shares an affinity or from the other users to the particular user. The recommendations that are generated are transmitted for display to the users for whom they are generated.

In accordance with yet another method for detecting temporal music trends in an online service, executing on one or more computing devices, music consumption habits of a user are analyzed to obtain, for example, times at which a particular user consumed a particular track, album, or playlist. The times are discretized into buckets, for example, by minute, hour, or day. The method gauges a user's consumption habits to formulate recommendations from the user to other users.

BRIEF DESCRIPTION OF THE DRAWINGS

The present disclosure is illustrated by way of example, and not by way of limitation, in the figures of the accompanying drawings, in which like reference numerals are used to refer to similar elements.

FIG. 6 is a matrix diagram used in some embodiments of the system, illustrating examples of relationship strengths between users of the online service.

FIG. 7 is a matrix diagram used in other embodiments of the system, illustrating examples of relationship strengths between users of the online service.

DETAILED DESCRIPTION

Figure 1:
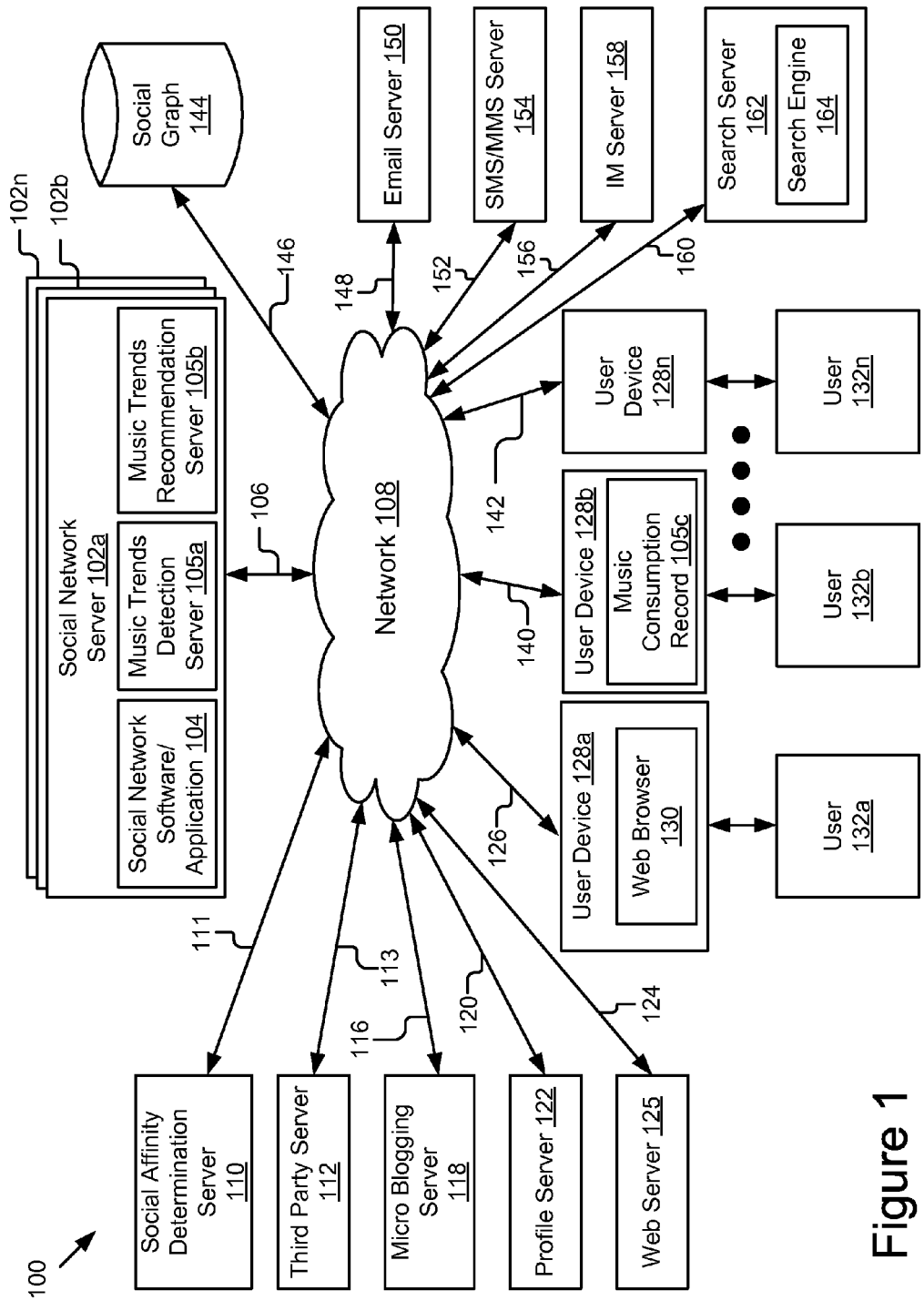
FIG. 1 is a high-level block diagram illustrating some embodiments of a system for automatically detecting temporal music trends in an online community or service and generating recommendations for users of the online community or service.

In some examples, the specification describes a system and methods for automatically detecting temporal trends of music in an online community, for example, social networks, and generating recommendations on music of interest between users sharing a social affinity. In the following description, for purposes of explanation, numerous specific details are indicated in order to provide a thorough understanding of the technology described. It should be apparent, however, to one skilled in the art that this technology can be practiced without these specific details. In other instances, structures and devices are shown in block diagram form in order to avoid obscuring the technology. For example, the present technology is described with some embodiments below with reference to user interfaces and particular hardware. However, the present technology applies to any type of computing device that can receive data and commands, and any devices providing services. Moreover, the present technology is described below primarily in the context of detecting music trends and generating recommendations; however, those skilled in the art should understand that the present technology applies to any type of communication and can be used for other applications beyond generating recommendations of music. In particular, monitoring user activities in an online service relating to an interest and automatically detecting data desirable for other users and generating recommendations may be used in other contexts besides music.

Reference in the specification to "one embodiment," "an embodiment," or "some embodiments" means simply that one or more particular features, structures, or characteristics described in connection with the one or more embodiments is included in at least one or more embodiments that are described. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory of either one or more computing devices. These algorithmic descriptions and representations are the means used by those skilled in the data processing arts to most effectively convey the substance of their work to others skilled in the art. An algorithm as indicated here, and generally, is conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the following discussion, it should be appreciated that throughout the description, discussions utilizing terms such as "processing," "computing," "calculating," "determining," or "displaying" or the like, refer to the action and processes of a computer system, or similar electronic computing device, that manipulate and transform data represented as physical (electronic) quantities within the computer system's registers and memories into other data similarly represented as physical quantities within the computer system memories or registers or other such information storage, transmission, or display devices.

The present technology also relates to an apparatus for performing the operations described here. This apparatus may be specially constructed for the required purposes, or it may comprise a general-purpose computer selectively activated or reconfigured by a computer program stored in the computer. Such a computer program may be stored in a computer-readable storage medium, such as, but not limited to, any type of disk including floppy disks, optical disks, CD-ROMs, magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

This technology can take the form of an entirely hardware embodiment, an entirely software embodiment, or an embodiment containing both hardware and software components. In some embodiments, the technology is implemented in software, which includes but is not limited to firmware, resident software, microcode, etc.

Furthermore, the technology can take the form of a computer program product accessible from a computer-usable or computer-readable medium providing program code for use by or in connection with a computer or any instruction execution system. For the purposes of this description, a computer-usable or computer-readable medium may be any apparatus that can contain, store, communicate, propagate, or transport the program for use by or in connection with the instruction execution system, apparatus, or device.

A data processing system suitable for storing and/or executing program code includes at least one processor coupled directly or indirectly to memory elements through a system bus. The memory elements can include local memory employed during actual execution of the program code, bulk storage, and cache memories, which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable them to couple to other data processing systems, remote printers, or storage devices, through either intervening private or public networks. Modems, cable modems, and Ethernet cards are just a few examples of the currently available types of network adapters.

Finally, the algorithms and displays presented in this application are not inherently related to any particular computer or other apparatus. Various general-purpose systems may be used with programs in accordance with the teachings here, or it may prove convenient to construct more specialized apparatus to perform the required method steps or operations. The required structure for a variety of these systems is outlined in the description below. In addition, the present technology is not described with reference to any particular programming language. It should be understood that a variety of programming languages may be used to implement the technology as described here.

System Overview

FIG. 1 is a high-level block diagram illustrating some embodiments of a system for automatically detecting temporal music trends in an online community and generating recommendations between users of the online community. The system 100 illustrated in FIG. 1 automatically detects temporal music trends and generates recommendations between users depending on the social affinity they share. The system 100 includes one or more social network servers 102a, 102b, through 102n, a social affinity determinations server 110 (which may be configured within the social network or apart as illustrated), user devices 128a, 128b, through 128n that are variously accessed by users 132a, 132b, through 132n. These entities are communicatively coupled via a network 108. Although only three user devices 128a, 128b, through 128n are illustrated, persons of ordinary skill in the art should recognize that any numbers of user devices 128n may be used by any number of users 132n. Moreover, those skilled in the art should recognize that while the present disclosure is described below primarily in the context of automatically detecting temporal music trends and generating recommendations, the present disclosure may be applicable to any type of online communications.

The user devices 128a, 128b, through 128n in FIG. 1 are illustrated by way of example. Although FIG. 1 illustrates only three devices, the present disclosure applies to any system architecture having one or more user devices 128, therefore, any number of user devices 128n may be used. Furthermore, while only one network 108 is illustrated as coupled to the user devices 128a, 128b, through 128n, the social network servers 102a-102n, the social affinity determination server 110, and a third party server 112, in practice any number of networks 108 may be connected to these entities. In addition, although only one third party server 112 is shown, the system 100 may include one or more third party servers 112.

In some embodiments, the social network server 102a is coupled to the network 108 via a signal line 106. The social network server 102a includes a social network software/application 104. Although only one social network server 102a is described in detail here, persons of ordinary skill in the art should recognize that multiple servers may be present, as illustrated by social network servers 102b through 102n, each with functionality similar to social network server 102a or different.

The term "social network" as used here encompasses its plain and ordinary meaning including, but not limited to, any type of social structure where the users are connected by a common feature or link, for example, Orkut. The common feature includes relationships/connections, e.g., friendship, family, work, a similar interest (for example, music interest), etc. The common features are provided by one or more social networking systems, such as those included in the system 100, including explicitly-defined relationships and relationships implied by social connections with other online users, where the relationships form a social graph 144.

The term "social graph" as used here encompasses its plain and ordinary meaning including, but not limited to, a set of online relationships between users, such as provided by one or more social networking systems, such as social network system 100, including explicitly-defined relationships and relationships implied by social connections with other online users, where the relationships form a social graph. In some examples, the social graph 144 may reflect a mapping of these users and how they are related.

It should be understood that the social network server 102*a* includes a social network software/application 104 (for operating the social network) and is representative of a single social network. The social network server 102*a* may be a computer hardware system with a distributed architecture with software components. Each of the plurality of social networks 102*a*, 102*b* through 102*n*, as illustrated, is coupled to the network 108, each having its own processor (one or more), application, and social graph. For example, a first social network may be directed to business networking, a second directed to or centered on academics, a third directed to local business, a fourth directed to dating, and yet others directed to other general interests or perhaps a specific focus.

A social affinity determination server 110 is illustrated as a stand-alone server in FIG. 1 for illustration purposes. In other embodiments of the system 100, all or part of the social affinity determination server may be part of the third party server 112 that is connected to the network 108 via signal line 113 or a part of the social network server 102*a*. The social affinity determination server 110 interacts with the other servers, a micro blogging server 118, a profile server 122, a web server 1265 an email server 150, an sms/mms server 154, an IM server 158, and a search server 162 (including a search engine 164) via the network 108. Each of the servers is illustrated separately for description purposes, but may be configured in accordance with any architecture to perform the methods described here.

The social affinity designation server 110 is also coupled for communication with the user device 128*a*, which is connected to the network 108 via signal line 126. The user 132*a* interacts with the user device 128*a* to access the social network 102*a* or any other server. Similarly, the user device 128*b* is coupled to the network 108 via signal line 140 and the user 132*b* interacts with the user device 128*b*. The user 132*n* interacts with the user device 128*n*, which is connected to the network 108 via line 142. Persons of ordinary skill in the art should recognize that the social affinity determination server 110 may be stored in any combination of the devices and servers illustrated, or in only one of the devices or servers illustrated.

The user devices 128*a* through 128*n* may be a computing device, for example, a laptop computer, a desktop computer, a tablet computer, a mobile or cell telephone, a personal digital assistant (PDA), a mobile email device, a portable game player, a portable music player, a television with one or more processors embedded in the television or coupled to it, or any other electronic device capable of accessing a network.

The network 108 is a conventional type, wired or wireless, and may have any number of configurations such as a star configuration, token ring configuration, or other configurations known to those skilled in the art. Furthermore, the network 108 may comprise a local area network (LAN), a wide area network (WAN, e.g., the Internet), and/or any other interconnected data path across which one or more devices may communicate.

In another embodiment, the network 108 may be a peer-to-peer network. The network 108 may also be coupled to or include portions of one or more telecommunications networks for sending data in a variety of different communication protocols.

In yet another embodiment, the network 108 includes Bluetooth communication networks or a cellular communications network for sending and receiving data such as via short messaging service (SMS), multimedia messaging service (MMS), hypertext transfer protocol (HTTP), direct data connection, WAP, email, etc.

The social network server 102*a* comprises social network software/application 104, a music trends detection server 105*a*, and a music trends recommendation server 105*b*. The music trends detection server 105*a* and the music trends recommendation server 105*b* are dynamic systems that automatically detect temporal music trends and generate recommendations between users 132*a* through 132*n* of the social network 102*a*, within social circles of communication established for those users. In addition, the music trends detection server 105*a* and the music trends recommendation server 105*b* may generate recommendations for users in other social networks. In some embodiments, a music consumption record 105*c* with data on a track, album, or playlist, consumed by a specific user 132*b* is maintained in user device 128*b*. Alternatively, this record 105*c* may be maintained collectively in the music trends detection server 105*a* for various users. This record may be temporary or permanent until transferred or purged, either automatically (at periodic intervals or upon an action by the system) or by input from the users 132*a*, 132*b*, through 132*n*. The music trends detection server 105*a* and music trends recommendation server 105*b* interact with other systems to automatically retrieve or receive music consumption information or a music consumption stream for users and automatically generate recommendations for other users within their circles of communication or with whom they share affinity.

In some embodiments, the music trends detection server 105*a* receives music consumption information or streams from the other systems, for example, a third party server 112, a micro blogging server 118, a profile server 122, a web server 125, an email server 150, a sms/mms server 154, an IM server 158, or a search server 162. The music trends detection server 105*a* processes this information, in some instance continuously, to gather music consumption data and habits to determine the "latest" or "popular" music, including a music track, album, or playlist, that users are listening to and enjoying. In yet other embodiments, the music trends detection server 105*a* is configured to gather details on music consumption by users to determine features that reveal user tastes and preferences in artists, music genre, or the like. The music trends detection server 105*a* interacts with the users 132*a* through 132*n*, via user devices 128*a* through 128*n*, to gather music consumption data on users, either via the social network server 102*a*, or alternatively via other user interfaces (not shown). For example, the music detections server 105*a* interacts with the web browser 130 of the user devices 128*a* through 128*n*, to obtain information on music preferences and consumption patterns of users 132*a* through 132*n*. The music trends recommendation server 105*b* generates recommendations, based at least in part, on processing the data gathered by the music trends detection server 105*a* and interacts with the user devices 128*a* through 128*n* to generate user interfaces and convey recommendations as described in greater detail below.

In other embodiments, the music trends recommendation server 105*b* also cooperates with the email server 150 to generate recommendations and transmit them via e-mail messages. In yet other embodiments, the music trends recommendation server 105*b* also generates recommendations and sends commands to related electronic communication servers for example, the Short Message Service (SMS)/Multimedia Messaging Service (MMS) server 154, the instant messaging (IM) server 158, the web server 125, and/or the third party server 112.

In yet other embodiments, the music trends detection server 105*a* also receives data on electronic communications by users from the search server 162 coupled to the network 108, via signal line 160. In some embodiments, the search server 162 includes a search engine 164 for retrieving results responsive to music queries by users over the Internet. In some embodiments, the search engine 164 is powered by Google®. The web browser 130 in the user device 128*a* and the music trends recommendation server 105*b* cooperate to manage and send data to and from the third party server 112, via signal line 113, the micro-blogging server 118, via signal line 116, the profile server 122, via signal line 120, the user devices 128*a*, 128*b* through 128*n*, via signal lines 126, 140 through 142, the e-mail server 150 via signal line 148, the social graph 144 via signal line 146, the SMS/MMS server 154 via signal line 152, the IM server 158 via signal line 156, and the web server 125 via signal line 124.

In some embodiments, the social network server 102*a*, the third party server 112, the micro-blogging server 118, the e-mail server 150, the profile server 122, the SMS/MMS server 154, the IM server 158, the search server 162 and web server 125 are hardware servers including a processor, memory, and network communication capabilities. Any of these servers (other than the social network server 102*a*) may serve as an interface to the social network server 102*a*, to allow users to post comments, watch videos, and undertake in any such activity.

The email server 150 retrieves e-mail information, such as messages that have been received and sent, the status of messages as to whether they are read, unread, forward, replied to, etc. For example, the e-mail server 150 is an e-mail service such as Gmail™ offered by Google Inc. of Mountain View Calif. The e-mail server 150, in some embodiments interacts with a credentials module (not shown) to retrieve a user's login name and password as well as any other information necessary to access the e-mail server 150. The e-mail server 150 also stores information that has been retrieved for particular users and is coupled for communication with other e-mail servers. Those skilled in the art should recognize that even though the e-mail server 150 has been described above as connecting and determining information from a single e-mail system, the same operations may be performed for a plurality of e-mail systems that are utilized by a particular user. For example, users often have several different e-mail accounts. In some embodiments, the e-mail server 150 connects and gathers information from two or more of these several different e-mail accounts.

In some embodiments, the social affinity determination server 110 is coupled by network 108 for communication and interaction with the social network server 102*a* through 102*n*, social network software/application 104 and social graph 144. The social affinity server 110 determines a user's interaction and use of a social network 102*a* through 102*n*. The social affinity determination server 110 interacts with a profile server 122 (may be incorporated within a social network 102*a* or apart as illustrated) to retrieve a user's login and password as well as other information necessary to access (with the user's consent) the social network application 104 and social graph 144. The social affinity determination server 110 retrieves and collects user status information about messages sent, messages received, information posted, posted information reviewed, change in status of friends, the addition of user connections, removal of user connections, and any other activity associated with users on the social network. The social affinity determination server 110 also gathers and analyzes information from other individuals that is relevant, important, or linked to a user. In some embodiments, the application interface (API) of the social network 102*a* (part of the social network software/application 104) is used by the social affinity determination server 110 to determine the information required. Thus, those skilled in the art should recognize that the social affinity determination server 110 may retrieve any information related to a particular user (with user consent) from the social network 102*a*. The information that is advantageous to the analysis of determining music trends is stored in any database, for example, data storage 214. The social affinity determination server 110 is connected by a signal line 204 (FIG. 2A) to the data storage 214. Communications flow over a bus or a software communication mechanism 204*a* (illustrated in FIGS. 2B and 2C), which may be an object bus (such as CORBA), direct socket communication (such as TCP/IP sockets) among software modules, remote procedure calls, UDP broadcasts and receipts, HTTP connections, function or procedure calls, etc. Further, any or all of the communication could be secure (SSH, HTTPS, etc.). The software communications can be implemented on any underlying hardware, such as a network, the Internet, a signal line 204 of FIG. 2A, or a combination thereof. Example communications between users include friend requests, a post to a music source being monitored, or any other music consumption activity on the social network 102*a* of relevance to a user. The social affinity determination server 110 also interacts with the social network 102*a* through 102*n* to observe activity for example, accepting a friend's request, replying to a post or any other action on the social network to keep current on the status of relationships between users. In some embodiments, the social affinity determination server 110 is configured to determine affinity based on a particular item of music, by first determining the classification of music that the particular item of music falls into, for example, whether classical, rock, jazz, blues or the like. The social affinity determination server 110 then determines other users who enjoy the same type of music, for example, classical or rock. Alternatively, the social affinity determination server 110 may determine affinity based on one or more implicit measures or features extracted on the music item. In some embodiments, these implicit measures or features may belong to semantic classifications. Yet, in other embodiments, these one or more implicit measures or features extracted on the music item may be based on different criteria, and not on semantic classifications.

The social affinity determination server 110 includes a processor, memory, and network communication capabilities including software and routines for interacting with and determining information from any other electronic communication systems or sources described here. It has the credentials and the application interface for interacting with the other sources. It monitors the other sources for activities relating to user connections with others and also can take any action with regard to the activities that are allowed by the other sources. It gathers information related to the user connections and stores the information collected either in a local storage or in the data storage 214. Example other sources include the third party server 112, the micro-blogging server 118, the SMS/MMS server 154, the IM server 158, the search server 162 and the web server 125.

The database storage 214 (in FIGS. 2A, 5, and 9) stores information received from any of the other sources identified above. In some embodiments, the database storage 214 is a database organized by user. For each user, the data storage 214 stores any activity information on user connections and music consumption patterns of users received from any of the sources described above. For example, this can include e-mail details (such as header, sender, date, subject, etc.), social network activity such as posts, shares, invitations, status changes etc.

The music trends recommendations server 105b is real-time/push recommendation software and routines for creating recommendations based at least in part on data compiled by the music trends detection server 105a. For most of the detection sources described above, the music consumption data collection occurs by retrieving music identifiers from the music sources by polling, or on a periodic basis, as has been described above. However, in some embodiments, the various sources described above, may be configured to push the data in real time over signal line 106 to the music trends detection server 105a. In some embodiments, music trends detection server 105a has a persistent connection or browser channel 160 with the various sources that are providing data. The data received from the various sources or the user devices 128a through 128n is processed.

In some embodiments, the music trends detection server 105a includes an e-mail/text interface and a phone operating system interface, neither of which is shown. It should be understood that these interfaces are optional and if configured allow the music trends detection server 105a to receive data from e-mail servers 150 and SMS/MMS servers 154 owned and operated by other parties. The phone operating system interface allows mobile handsets (user devices 128a through 128n) operating a phone operating system such as Android to interact with the music trends detection server 105a.

Music Trends Detection Server 105a and Music Recommendations Server 105b

Figure 2A:
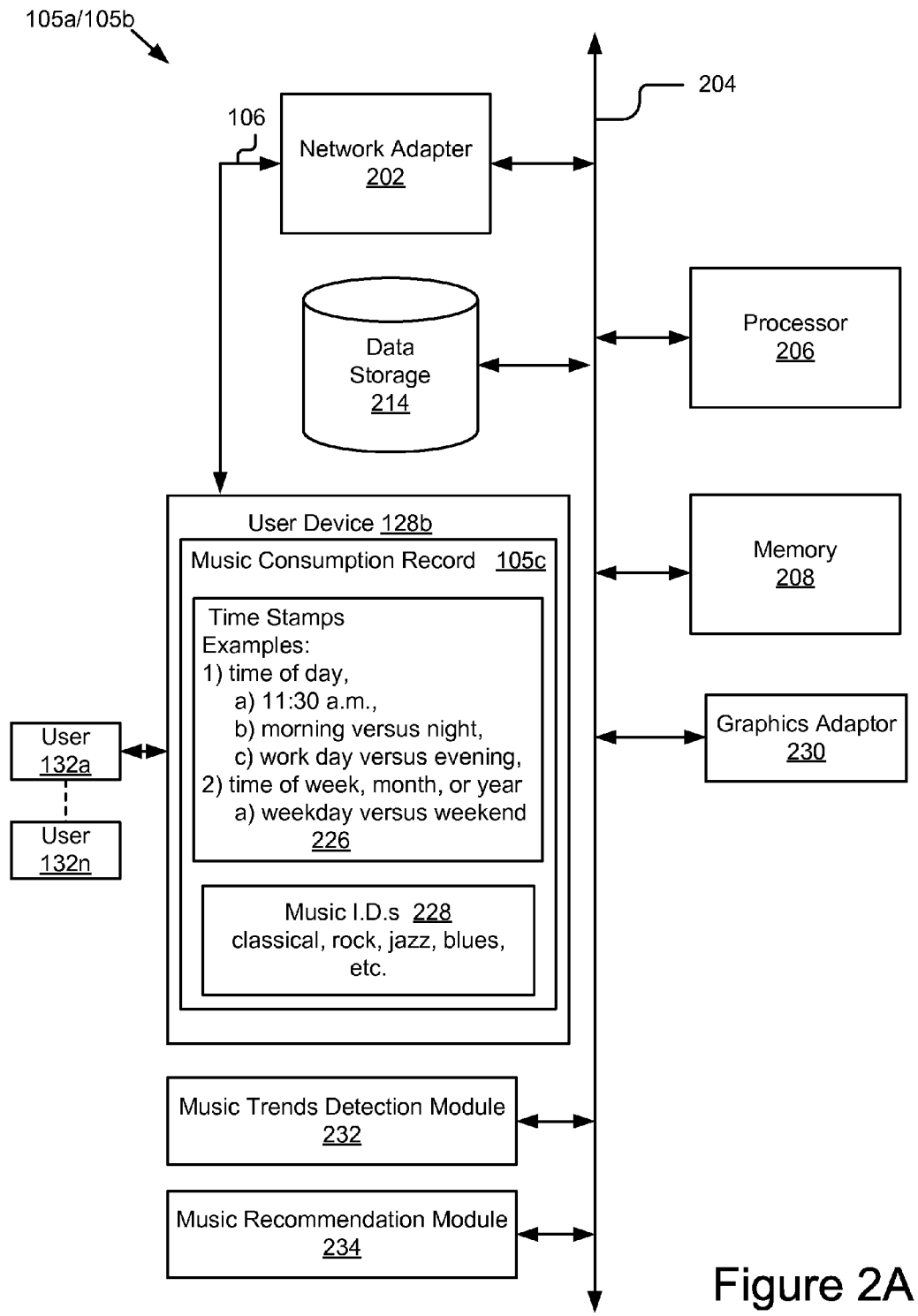
FIG. 2A is a block diagram illustrating some embodiments of the hardware components in the music trends detection server and the music trends recommendation server shown in FIG. 1.
Figure 2B:
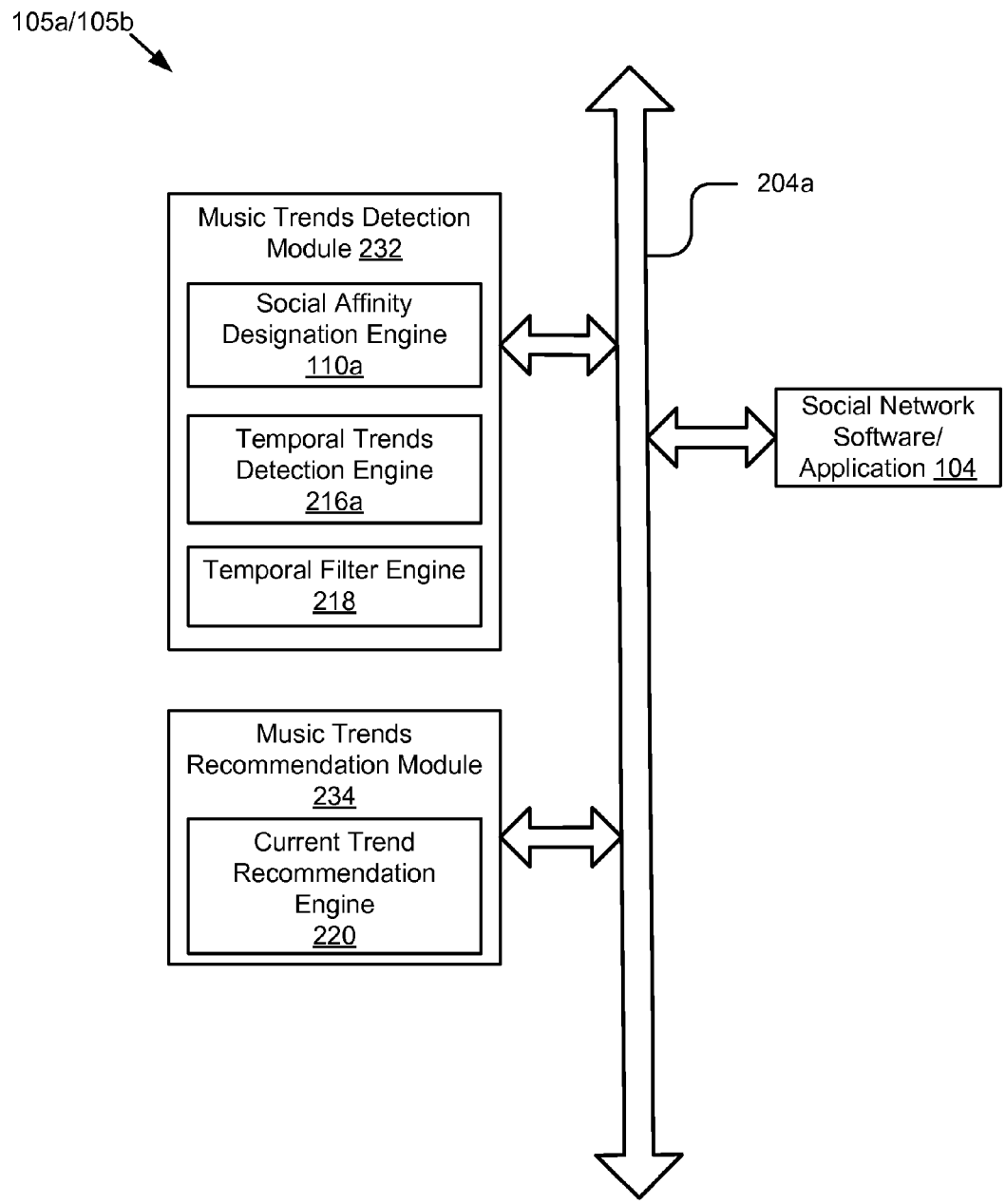
FIG. 2B is a block diagram illustrating some embodiments of the software components in 1) the music trends detection server of the system shown in FIG. 1, including a temporal trends detection engine and a temporal filter engine, and 2) the music trends recommendation server including a current trend recommendation engine.
Figure 2C:
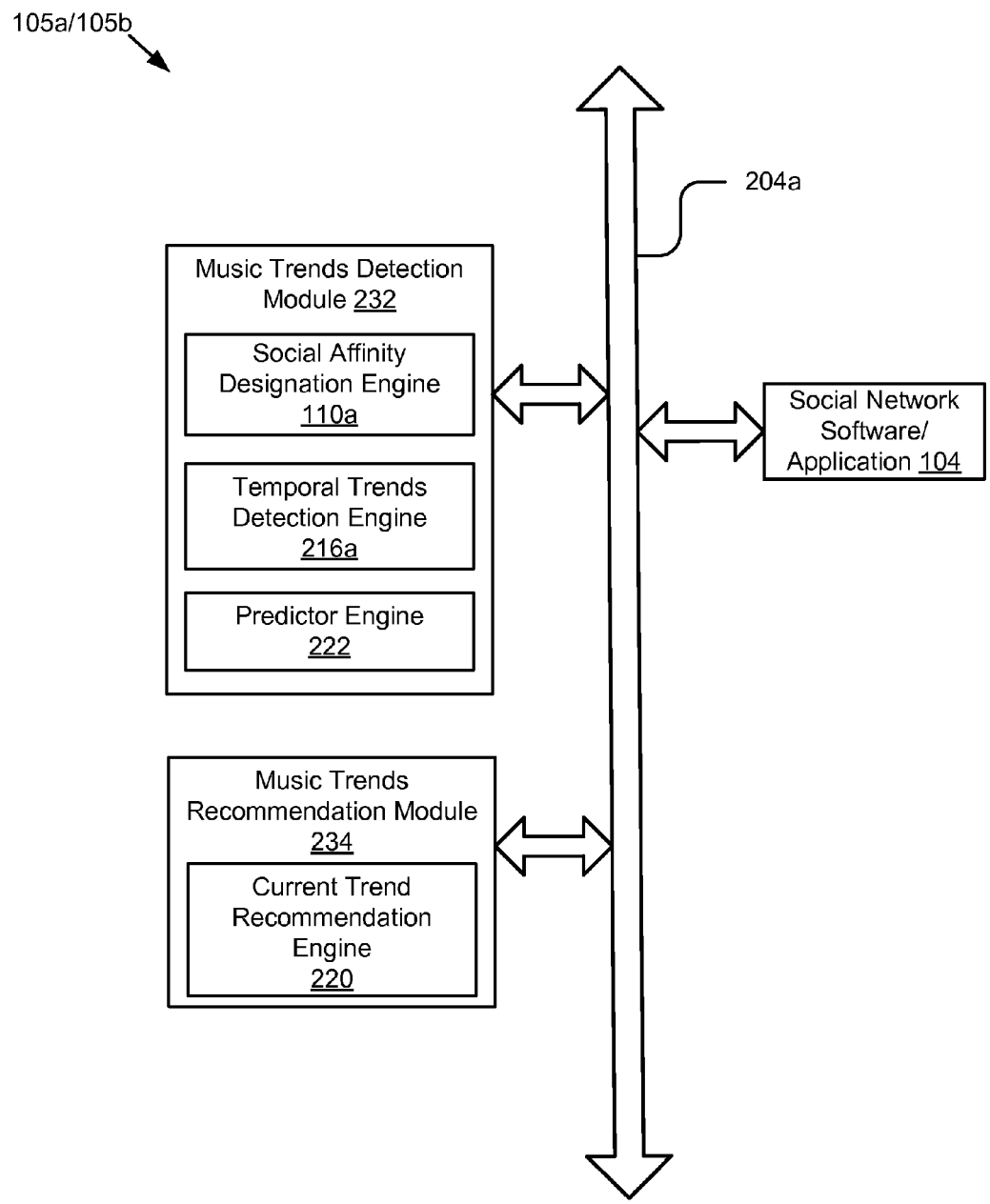
FIG. 2C is a block diagram illustrating other embodiments of the software components in 1) the music trends detection server of the system shown in FIG. 1, with a predictor engine, and 2) the music trends recommendation server including a current trend recommendation engine.

FIGS. 2A, 2B, and 2C are block diagrams illustrating some embodiments of the music trends detection server of the system shown in FIG. 1. Specifically, FIG. 2A illustrates some embodiments of the hardware components of the music trends detection server 105a including a music trends detection module 232 and the music trends recommendation server 105b including a music recommendation module 234. FIG. 2B illustrates the software components of some embodiments of the music trends detection server 105a including a social affinity designation engine 110a, a temporal trends detection engine 216a, and a temporal filter engine 218 and the software component of a music trends recommendation server 105b including a current trend recommendation engine 220. Referring also to FIGS. 2A, 2B, and 2C, like reference numerals have been used to reference like components with the same or similar functionality that has been described above with reference to FIG. 1. Since those components have been described above that description is not repeated here.

The music trends detection server 105a and the web browsers 130 (FIG. 1) cooperate to either receive music consumption patterns of various users or to transmit or post music recommendations to users. The music trends detection server 105a may derive a user's music consumption interests, via line 106, either via an activity or consumption stream input from the user devices 128a, 128b, through 128n, an e-mail/text interface (I/F), or a phone operating system interface (OS I/F), not separately shown. The activity or consumption stream input is coupled to the music detection server 105a, via line 106, to transmit music information from all the possibilities described above including from the web browser 130. The music consumption stream input over line 106 may also be coupled to a myriad of music sources to receive music information on user consumption patterns directly from those sources. The music information on user music consumption that is received may include music identifiers, or alternatively, if not, may be translated into music identifiers. In some embodiments, the music trends detection server 105a also includes the e-mail/text interface and the phone operating system interface to which the activity stream input is coupled. The music trends detection server 105a is configured to gather music consumption data for users from any one or more of the social network servers 102a through 102n, the third party server 112, the micro-blogging server 118, the e-mail server 150, the profile server 122, the SMS/MMS server 154, the IM server 158, the search server 162, and the web server 125, all of which have been described above with reference to FIG. 1.

In some embodiments, as illustrated in FIG. 2A, the music trends detection server 105a and music trends recommendation server 105b comprise a network adapter 202, a processor 206, memory 208, data storage 214, and a graphics adaptor 230. The network adapter 202 is coupled to the network 108, by signal line 106, and connected to other components of the social network server 102a by a signal line 204. The network adapter 202 interfaces with the network 108 and other components. It includes ports for wired connectivity, for example, USB, SD, or CAT-5, etc. The network adapter 202 functions as an interface module to link the processor 206 to the network 108, which in turn may be coupled to other processing systems. The network adapter 202 provides other conventional connections to the network 108 using standard network protocols such as TCP/IP, HTTP, HTTPS and SMTP, as should be understood to those skilled in the art. In other embodiments, the network adapter 202 includes a transceiver for sending and receiving signals using WiFi, Bluetooth® or cellular communications for wireless communication.

The processor 206 comprises an arithmetic logic unit, a microprocessor, a general purpose controller or some other processor array to perform computations and provide electronic display signals to a display device via the graphic adapter 230. The processor 206 is coupled to the bus 204a (FIGS. 2B and 2C) for communication with the other components. The processor 206 processes data signals and may comprise various computing architectures, including a complex instruction set computer (CISC) architecture, a reduced instruction set computer (RISC) architecture, or an architecture implementing a combination of instruction sets. Although only a single processor is shown in FIG. 2A, a plurality of processors may be used. It should be obvious to one skilled in the art that other processors, operating systems, sensors, displays, and physical configurations may be used to perform the functionalities and operations, instead of the ones described here.

The memory 208 stores instructions and/or data that may be executed by processor 206. The memory 208 is coupled to the bus 204a for communication with the other components. The instructions and/or data may comprise code for performing any and/or all of the techniques described here.

The memory 208 may be a dynamic random access memory (DRAM) device, a static random access memory (SRAM) device, flash memory, or some other memory device known in the art.

In some embodiments, data storage 214 stores data, information, and instructions used by the music trends detection server 105a and music trends recommendation server 105b. Such stored information includes information about users and other information retrieved by activity stream input via line 106. In one embodiment, the data storage 214 also stores data and other information utilized by the social network servers 102a through 102n. Data storage 214 is a non-volatile memory or similar permanent storage device and media such as a hard disk drive, a floppy disk drive, a CD-ROM device, a DVD-ROM device, a DVD-RAM device, a DVD-RW device, a flash memory device, or some other mass storage device known in the art for storing information on a more permanent basis. The data storage 214 is coupled by the signal line 204 for communication with other components of servers 105a and 105b, including music trends detection module 232 and music recommendation module 234. Referring now also to FIGS. 2B and 2C, the bus 204a connects the music trends detection module 232 and the music trends recommendation module 234 to the social network software application 104.

Each of these modules 232 and 234 is coupled to the bus 204a for communication with each other and other components. At a general level, the music trends detection module 232 gathers data on music consumption patterns of the various users 132a through 132n, via user devices 128a through 128n (shown in FIGS. 1 and 9). The detection module 232 automatically tracks the music patterns of users, for example, to record the track, album, or playlist that a specific user is downloading or listening to. In some embodiments, this information may be preliminarily maintained on a user device 128a, for example, in the form of time stamps 226 (FIG. 2A) for corresponding music identifiers (or I.D.s). In other embodiments, this information may be provided directly by the user or transmitted with the user's consent, to the data storage 214. In some embodiments, this information may be continuously retrieved in real-time. The music trends detection server 105a is also coupled for communication with the music consumption and activity streams from the various sources described above, which is received as input via signal line 106. The music trends detection server 105a retrieves information from the consumption and activity streams and also sends commands to any of the sources via the signal line 106.

The music trends detection module 232 includes a social affinity designation engine 110a to determine relationship strengths between users, for example, whether users are friends, acquaintances, work together, have similar interests (for example, music interests) or the like. The social affinity designation engine 110a may be software and routines for processing information on users and their connections with one another. The social affinity designation engine 110a is coupled for communication with the user devices 128a through 128n, in particular, the web browser 130 (FIG. 1). The social affinity designation engine 110a analyzes user connections to determine user relationships. It uses a relationship strength assessment code (either formulated to evaluate varying levels of relationship strength or a binary code to designate whether the relationship invites sharing or not). The social affinity designation engine 110a serves as a controller to compile a list of all the user names.

The music trends detection module 105a also includes a temporal trends detection engine 216a that is configured to analyze music consumption data on users. A record of a user's music consumption is received, with the user's consent, based at least in part on which the temporal trends detection engine 216a determines a user's music habits and listening patterns. A music consumption record 224 for each individual user may be created and stored in the user device 128a (shown by way of example). Alternatively, this record 224 may be created and stored in a database associated with the social network server 102a, shown in FIGS. 2A, 5, and 9 as data storage 214. A music consumption record 224 (FIG. 2A) includes time stamps 226 and music I.D.s (identifiers) 228. The music identifiers 228 serve to identify each song, track, or album in a user's playlist and the time stamps 226 indicate times at which a user downloaded these in his or her library. The time stamps may be a specific time of day, for example, 11:30 a.m., a morning hour versus a night hour, a work day versus evening. A time stamp may also be a time of week, for example, a weekday versus a weekend, or a month, or year. Structured analysis of the time may be conducted in various ways to generate appropriate recommendations.

In some embodiments, the music trends detection module 105a includes a temporal filter engine 218 (FIG. 2B) that serves to determine the newly released tracks, "hot" songs and current trends in music. A music trends recommendation module 234 has a current trend recommendation engine 220, which together with the social affinity designation engine 110a, determines a user's circles in the social graph 144 (FIG. 1). The current trend recommendation engine 220 and the social affinity engine 110a further consider the relationship strengths between users and then generate recommendations of music for users. The recommendations of music may be of a single track, a song, album, an entire playlist, or the like. The current trend recommendation engine 220 has software and routines for determining the proper format for generating and transmitting recommendation information (the number of recommendations, the recommendation list and the recommendation details etc.). For example, recommendations may be generated and transmitted immediately, upon learning of a "hot" song that is likely to appeal to friends of a user, or periodically, say once a week. The recommendations engine 220 may reconfigure recommendations for presentation to a user based on various factors such as time, relevance, freshness, communication type, interest level to the user (in the event there are more than one), popularity, etc. For example, in some embodiments, the current trend recommendation engine 220 only presents a predetermined number of recommendations such as the top nine recommendations ranked by a combination of relevance and time. In other embodiments, the current trend recommendation engine 220 may coalesce or group a plurality of recommendations into a single recommendation blast when they relate to the same music genre or type or have some other common characteristic. The recommendations engine 220 refers to the music identifier, but may provide further details with title, artist etc.

As indicated above, FIG. 2C is a block diagram illustrating other embodiments of the music trends detection server 105a of the system shown in FIG. 1, with a temporal predictor engine 216b and a predictor engine 222, and the music trends recommendation module 234 including a current trend recommendation engine 220. In these embodiments, the temporal predictor engine 216b retrieves features relating to music consumption from a user's social graph. The temporal predictor engine 216b sorts and discretizes time stamps into buckets, from most recent to the original, for example, last minute, last hour, last day etc. The predictor engine 222 is configured to analyze music consumption by users and to predict likely recommendations for other users with whom a user is connected. Recommendations that are generated are transmitted by the current trend recommendation engine 220.

In some embodiments, the current trend recommendation engine 220, not only generates and transmits recommendations, but may keep records on user status for each user in a local memory or the data storage 214, which is capable of storing numerous records. For example, the current trend recommendation engine 220 keeps a record of which recommendations have been accepted by the user, which recommendations have not been accepted by the user and how many are un-reviewed or unread by the user. This information may be further used to refine the process of creating recommendations for users.

Figure 3:
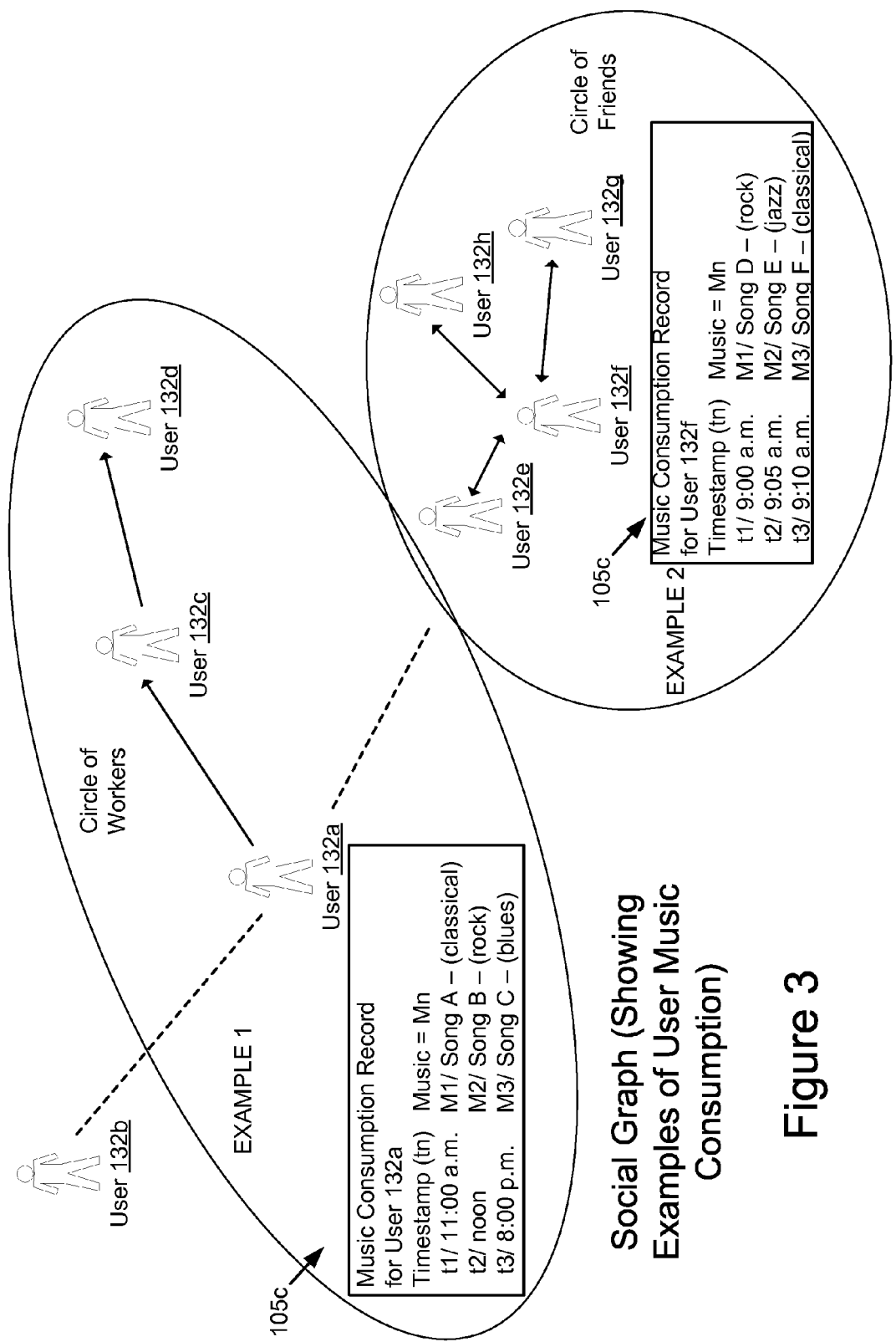
FIG. 3 is a graphic representation of a social graph, illustrating by way of example music consumption data for two particular users of an example online service.

Referring now to FIG. 3, it should be recognized that the social graph 144 (FIG. 1) may involve any number of users connected via a social network. The examples illustrated in FIG. 3 show two separate social graphs with eight examples of users, namely, 132*a*, 132*b*, 132*c*, 132*d*, 132*e*, 132*f*, 132*g*, and 132*h*. In Example 1, user 132*a* is connected with users 132*c* and 132*d*, forming a shared circle of co-workers. User 132*a* is connected with user 132*b*, but barely knows that user 132*b*, as illustrated by a broken line. The strength of a relationship between the users is gauged by the social affinity determination server 110 (FIG. 1) to assess recommendations of music.

FIG. 3 also illustrates one example of a music consumption record 105*c* for a user 132*a*. User 132*a* consumed a first music item M1, which is Song A (classical), at 11:00 a.m. (time stamp—t1), a second music item M2, which is Song B (rock) at noon (time stamp—t2), and a third music item M3, which is Song C (blues) at 8:00 p.m. (time stamp—t3). Time stamp t1 further identifies that user 132*a* discovered Song A (classical) on Day 1. Time stamp t2 further identifies that user 132*a* discovered Song B (rock) on Day 2. Time stamp t3 further identifies that user 132*a* discovered Song C (blues) on Day 3.

By way of another example, FIG. 3 illustrates yet another example, Example 2 to illustrate social connections between users 132*e*, 132*f*, 132*g*, and 132*h*, forming a circle of friends for user 132*f*. Another example of a music consumption record 105*c* for user 132*f* is illustrated here. User 132*f* consumed a first music item M1, which is Song D (rock), at 9:00 a.m. (time stamp—t1), a second music item M2, which is Song E (jazz) at 9:05 a.m. (time stamp—t2), and a third music item M3, which is Song F (classical) at 9:10 a.m. (time stamp—t3). Time stamp t1 further identifies that user 132*f* discovered Song D 20 on Day 1, perhaps minutes ago. Time stamp t2 further identifies that user 132*a* discovered Song E, on Day 1 as well, but 15 minutes ago and time stamp t3 further identifies that user 132*f* discovered Song F on Day 3, perhaps 10 minutes ago.

Figure 4:
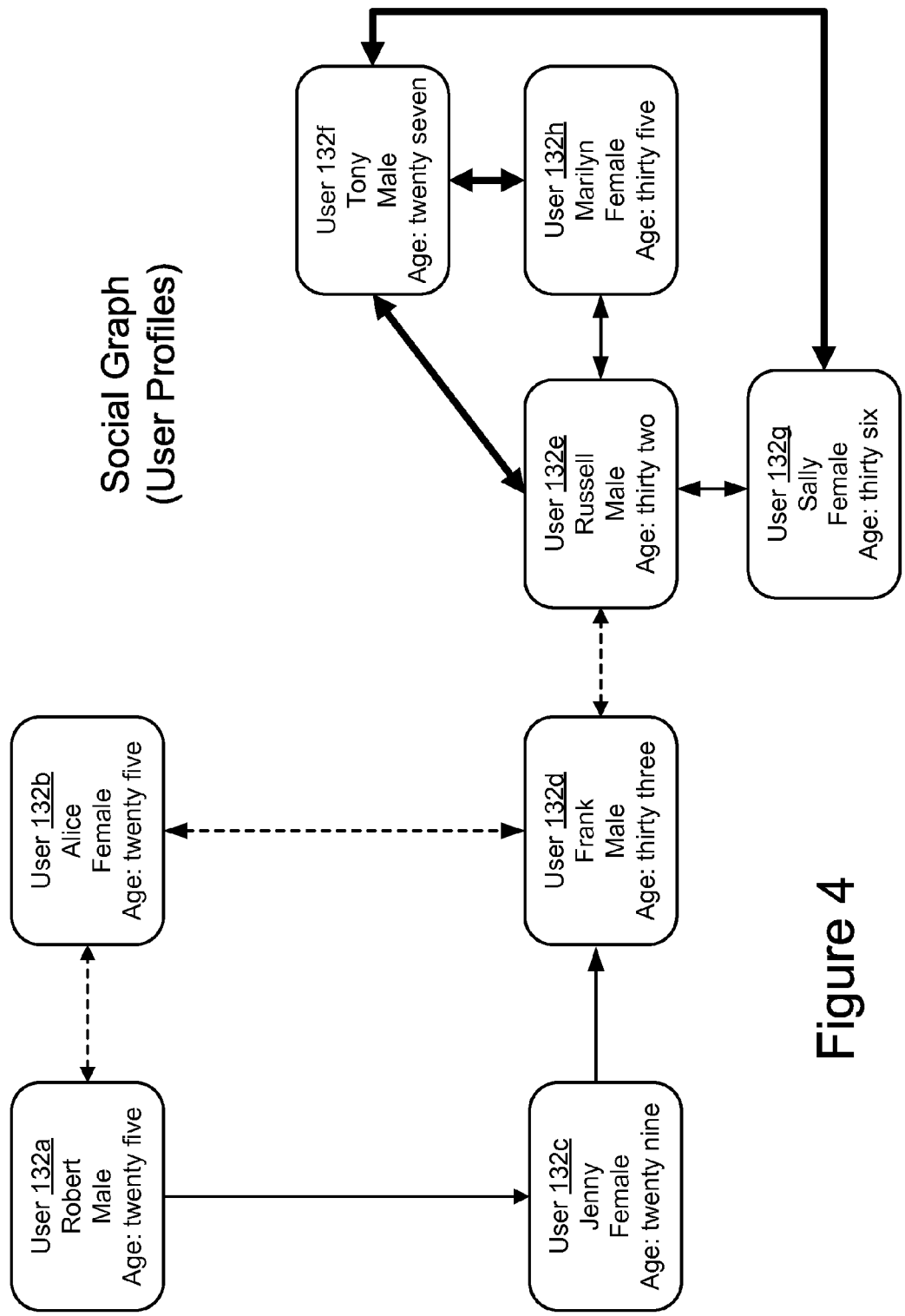
FIG. 4 is a graphic representation of a social graph, illustrating by way of example, profiles of the users of the online service shown in FIG. 3.

Referring now to FIG. 4, a social graph with all eight users with their profile information, for example, user names, gender, age etc. is illustrated. The broken lines connecting users indicate no relationship between the users or that they are barely known to one another. Solid lines indicate a relationship between the users, for example, whether they are friends, co-workers, have similar interests (e.g., music preferences based on music classifications of classical, rock, jazz, blues etc.), or whatever the criteria. In particular in FIG. 4, it is noteworthy that user 132*f* shares a stronger relationship with users 132*e*, 132*h*, and 132*g* (illustrated by thick lines connecting these users) whereas user 132*e* only knows user 132*h* and 132*g*, through association with user 132*f* (illustrated by thinner lines connecting these users).

Figure 5:
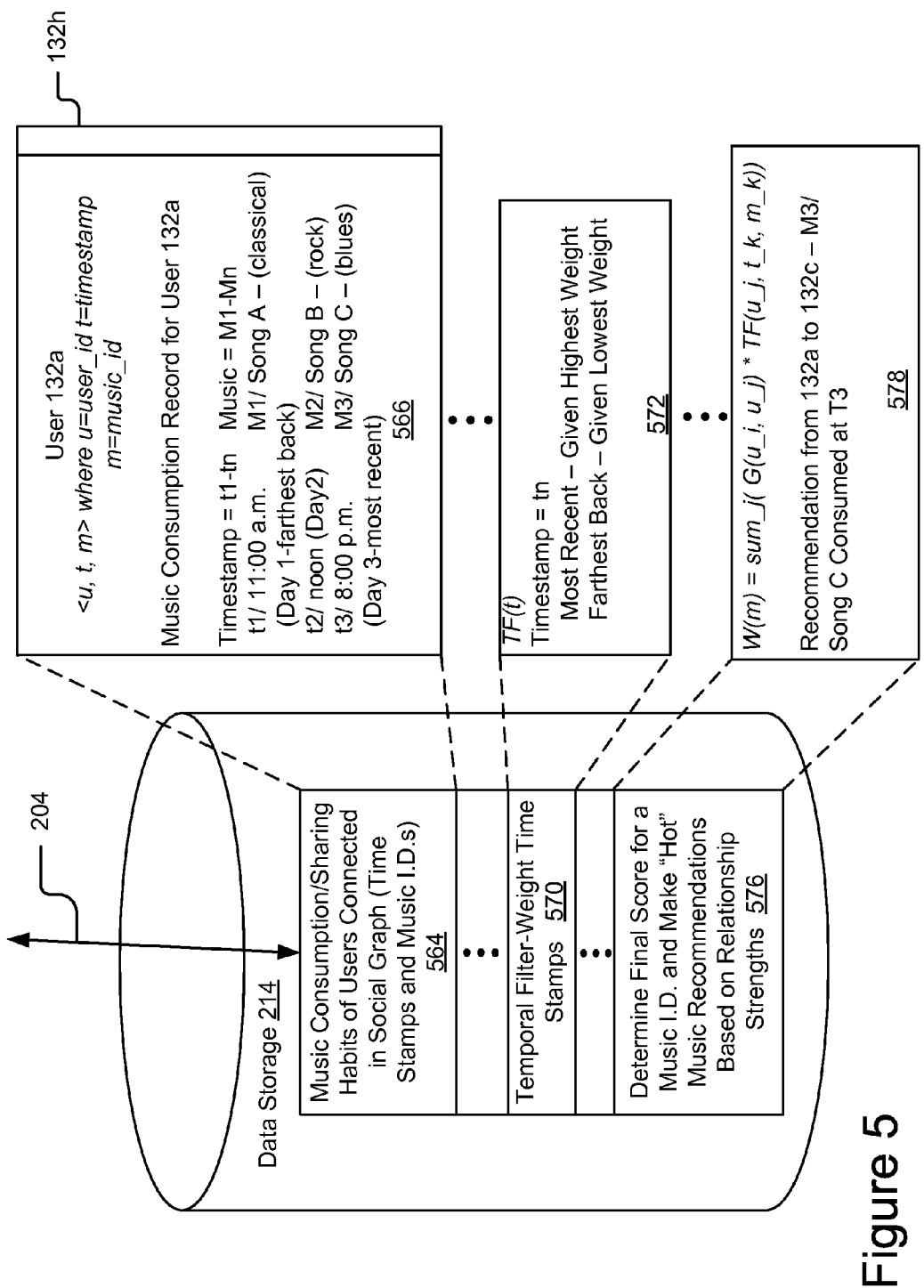
FIG. 5 is a graphic representation of a data storage unit of the system shown in FIG. 1, illustrating the filter engine stored in the data storage.

Referring now to FIG. 5, the data storage 214 stores in memory 564, accumulated music consumption records for users indicated by reference numeral 566. It may also store sharing habits, relationship strength information etc. By way of one example, the data storage 214 is illustrated as storing the music consumption record for user 132*a*. Again, user 132*a* consumed a first music item M1, which is Song A (classical), at 11:00 a.m. (time stamp —t1), a second music item M2, which is Song B (rock) at noon (time stamp—t2), and a third music item M3, which is Song C (blues) at 8:00 p.m. (time stamp—t3). Time stamp t1 further identifies that user 132*a* discovered Song A (classical) on Day 1. Time stamp t2 further identifies that user 132*a* discovered Song B (rock) on Day 2. Time stamp t3 further identifies that user 132*a* discovered Song C (blues) on Day 3. This music consumption record for user 132*a* is accumulated with music consumption records for other users as well. The temporal trends detection engine 216*a* creates tuples of the form $<u, t, m>$ where u=user_i d; t=timestamp; and m=music_i d.

Referring also to FIG. 6, in some embodiments, the temporal trends detection engine 216*a* together with the social affinity determination server 110 (FIG. 1) creates a graph represented by $G:U \times U \rightarrow R$ to represent social connections, U represents users and R represents the relationship strength between users. This graph may be asymmetric as is the case in the social network Google Plus. In some embodiments, the graph G is constructed as a matrix, indicated in FIG. 6 by reference numeral 600, with user identifiers 132*a* through 132*h* aligned along the rows and the columns of the matrix 600. An index indicated by reference numeral 610 indicates the relationship strengths between users and their social connections. In some embodiments, a coding scheme is utilized to assess and represent relationship strengths. By way of one example, if a user has no relationship with someone, the relationship strength is designated by "0." If a user has a social connection, where he or she barely knows another, the relationship strength is designated by "1." If the user has an acquaintance, the relationship is designated by "2," if the user shares similar interests with another (e.g., music preferences based on music classifications of classical, rock, jazz, blues etc.), the relationship is designated by "3," if the works with another person, the relationship is designated by "4," and if the user is friends with someone, the relationship strength is designated by "5." With reference to the social graphs illustrated in FIGS. 3 and 4, the social affinity designation engine 110*a* (FIGS. 2B and 2C), designates relationship strength values and inserts them in the compartments of the matrix 600. For example, user 132*a* barely knows user 132*b*, therefore, the social affinity designation engine 110*a* inserts a code "0" in compartment (a, b) of the matrix 600. User 132*a* works with user 132*c*, therefore, the social affinity designation engine 110*a* inserts a code "4" in compartment (a, c). With reference to another example of user 132*f*, again with reference to social graphs illustrated in FIGS. 3 and 4, the social affinity designation engine 110*a* notes that user 132*f* is friends with 132*g* and inserts a code "5" in the compartment (f, g) of the matrix 600. Accordingly, the social affinity designation engine 110*a* inserts the appropriate code for each of the user relationships. It should be recognized that this coding scheme is merely an example, and any other coding scheme to establish the strength of user relationships may be utilized.

Figure 8:
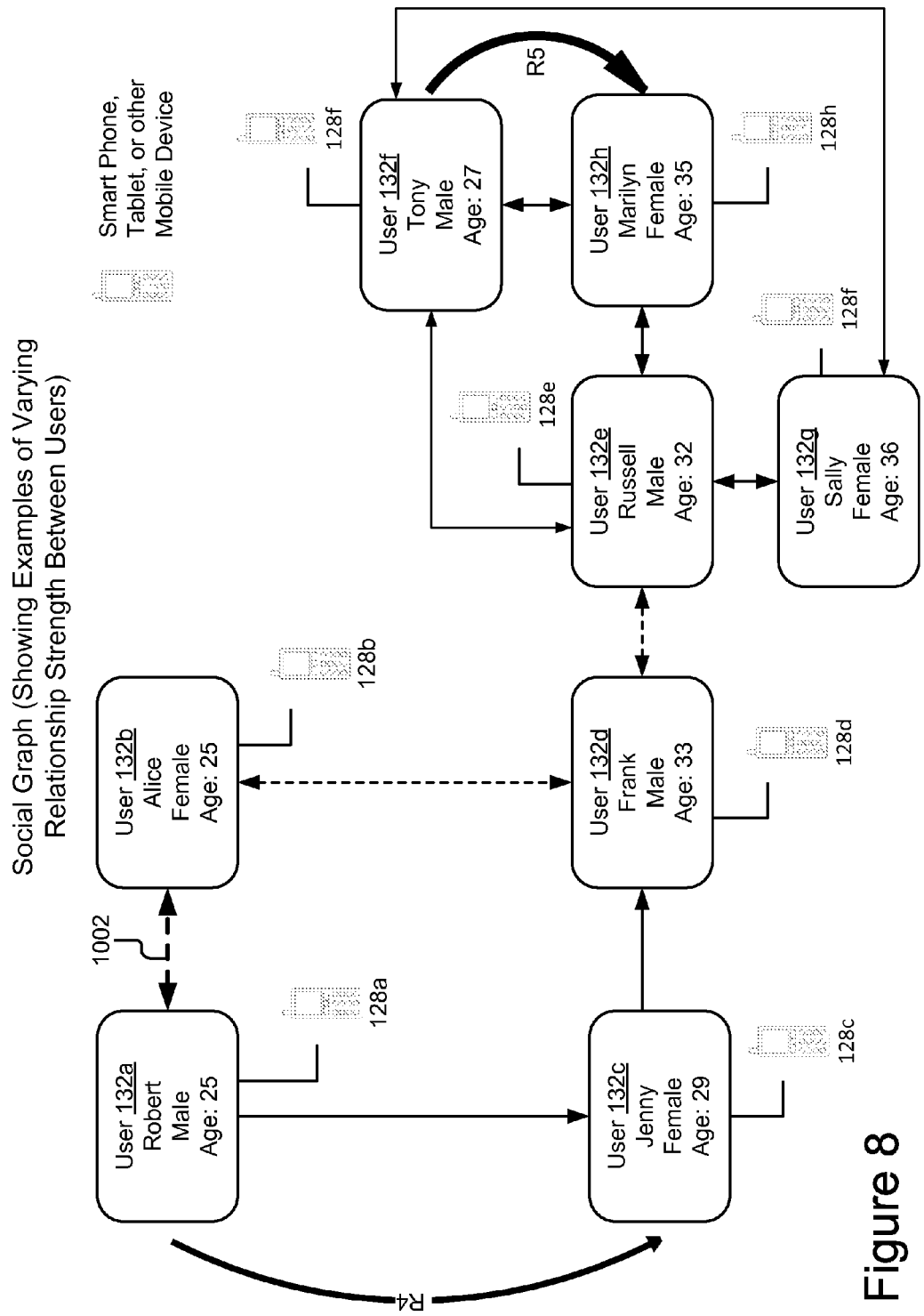
FIG. 8 is a social graph illustrating examples of different relationship strengths between users connected in the social graph.

Referring also to FIG. 8, the social graph of FIG. 4 illustrates two examples of relationship strengths between users 132a and 132c and users 132f and 132h. The relationship strength between users 132a and 132c is indicated by R4 (illustrated by a thinner arrow between user 132a and user 132c) and the relationship strength between users 132f and 132h is designated by R5 (illustrated by a thick arrow between user 132f and 132h).

To that end, referring now to FIG. 7, by way of another example, a binary coding scheme may be used, to indicate "sharing" of music if there is any relationship between users and "no sharing" if there is no relationship. The social affinity designation engine 110a in this scheme simply enters a code "0" or "1." By way of example, social affinity designation engine 110a inserts a code "1" in compartment (c, a) of the matrix 700 when it detects a relationship between users 132a and 132c and a code "0" in compartment (b, a) of the matrix 700 when it detects no relationship between users 132a and 132b (as indicated by the broken lines in the social graph illustrated in FIG. 3. The relationship strength assessment index is indicated in FIG. 7 by reference numeral 710.

Referring to 5 again (in combination with FIG. 2B), in some embodiments, the music trends detection engine 216a (FIG. 2B) uses a temporal filter engine 218 (FIG. 2B) that utilizes a temporal filtering function TF(t), which receives time-stamps and applies a weight associated with each of the time stamps. In the example illustrated in FIG. 5, the temporal filter engine 218 accords the highest weight to the timestamp most recent in time and the lowest weight to the timestamp that is the farthest back in time. This weighting scheme indicated by reference numeral 572 is stored at memory location 570 of the data storage 214. In some embodiments, the temporal filtering function TF(t) is configured as a function that decays as time elapses. For a user $u\_i$ (say user 132a in the illustrated example here), as illustrated at memory location 566 of the data storage 214, time stamp t3 is the most recent, therefore, Song C (blues) is user 132a's most recent discovery. The current "hot" songs to be recommended are determined by using the algorithm $W(m)=sum\_j(G(u\_i, u\_j)*TF(u\_j, t\_k, m\_k))$, where $u\_i$ and $u\_j$ are any two users in the Graph G and $t\_k$ is the time stamp for a particular music piece $m\_k$. This algorithm is stored at memory location 578 of the data storage 214. The sum W(m) determines the final score for a music_i d, to determine if it is an appropriate candidate for recommendation based at least in part on evaluation of relationship strengths (578 in the data storage 214). In the illustrated example, an appropriate recommendation from user 132a to user 132c is Song C (blues) consumed by user 132a at 8:00 p.m., on Day 3.

Figure 9:
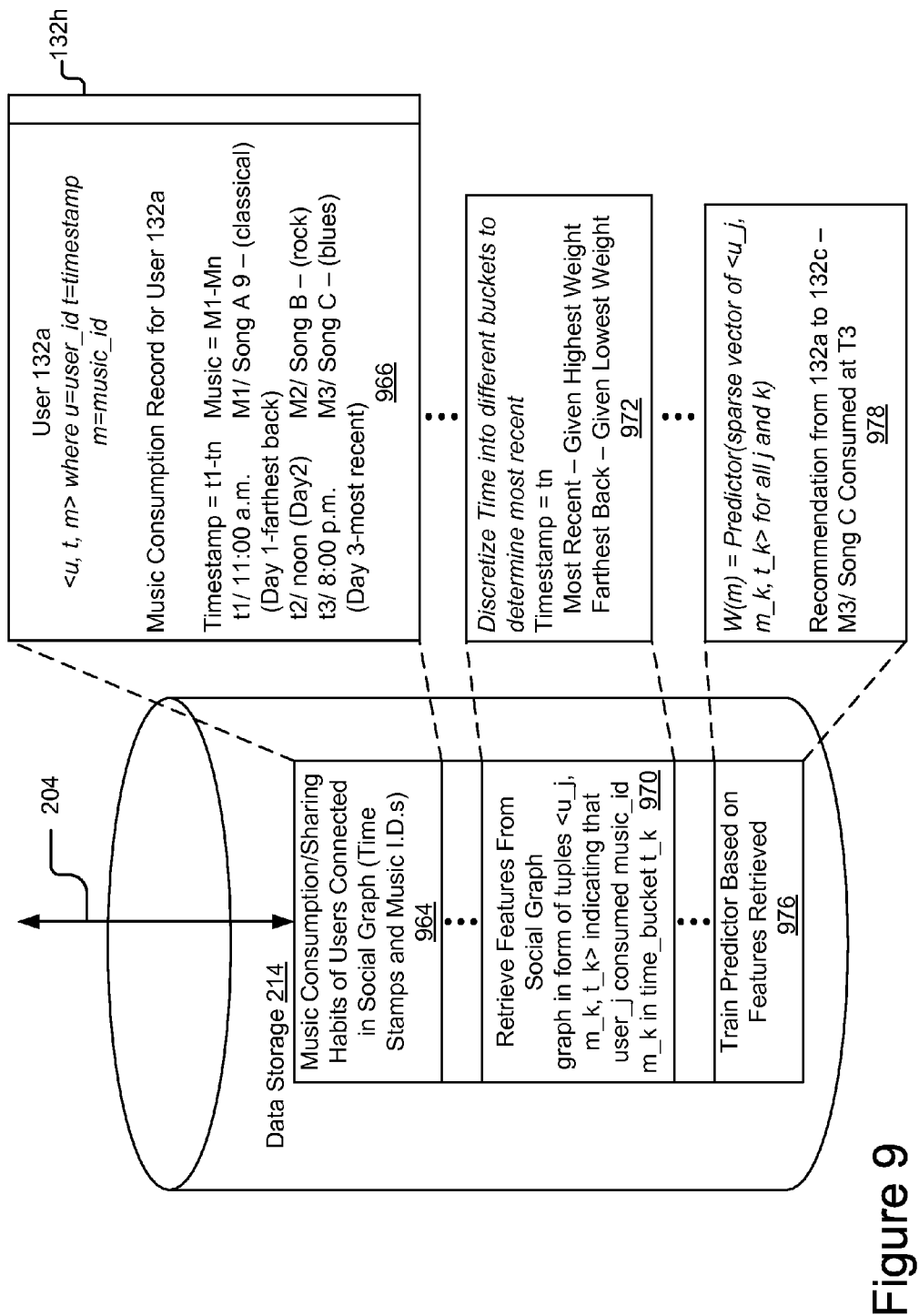
FIG. 9 is a block diagram of yet other embodiments of a data storage unit, illustrating the predictor engine stored in the data storage unit.

Referring to FIG. 9 (in combination with FIG. 2C), in other embodiments, memory location 970 of the data storage 214 stores the instructions executable by the temporal trends detection engine 216a and the predictor engine 222, to retrieve features from a user's social graph in the form of tuples <$u\_j, m\_k, t\_k$> indicating that user_j (any one of example users 132a through 132h) consumed music_i d $m\_k$ in time_bucket $t\_k$. The temporal trends detection engine 216a compiles the tuples for various users and discretizes the time stamps into different buckets to determine the most recent music consumed, for example, in the last minute, the last hour, the last day, etc. Again, the most recent time stamps are accorded the highest weight and the time stamps farthest back in time are accorded the lowest weight. With this information, the system trains its predictor engine 222 to apply the algorithm W(m)=Predictor(sparse vector of <$u\_j, m\_k, t\_k$> for all j and k). The learning scheme for the predictor engine 222 may be alternatively posed in the form of cross products, where the features in the form $u\_i \times u\_j$ inform on the sharing relationship of users with respect to music tastes. In some embodiments, a loss function model is used for mapping and a pairwise method is used for designing ranking models. The predictor engine 222 is trained using a sub-gradient descent approach. Alternatively, the predictor engine 222 may also be configured to use a loss function that is not pairwise, but which instead, pays greater attention to the top-ranked items.

The predictor engine 222 represents time in variable $t\_k$, with the variable $t\_k$ configured to obtain temporal structure. In some embodiments, the predictor engine 222 determines and stores the day in which a music piece $m\_k$ was played by a user $u\_j$ (any one of the eight users in the example used here) relative to the current day:

$t\_k\_day$=[day-0, day-1, day-2, day-3, . . . , day-k]

At the same time, the predictor engine 222 is configured to store the temporal context of the exact time during the day:

$t\_k\_context$=[morning, afternoon, evening]

In other embodiments, the predictor engine 222 is configured to consider the cross product of $t\_k\_day$ and $t\_k\_context$ to allow it to determine dependencies between day and time of day. In addition, the predictor engine 222 may be configured to determine V1: a fixed set of weights to relate $t\_k\_day$ and $t\_k\_context$ and V2: to learn the set of weights between $t\_k\_day$ the and $t\_k\_context$. It should be recognized that any number of different training models may be used to train the predictor engine 222.

Methods

Figure 10:
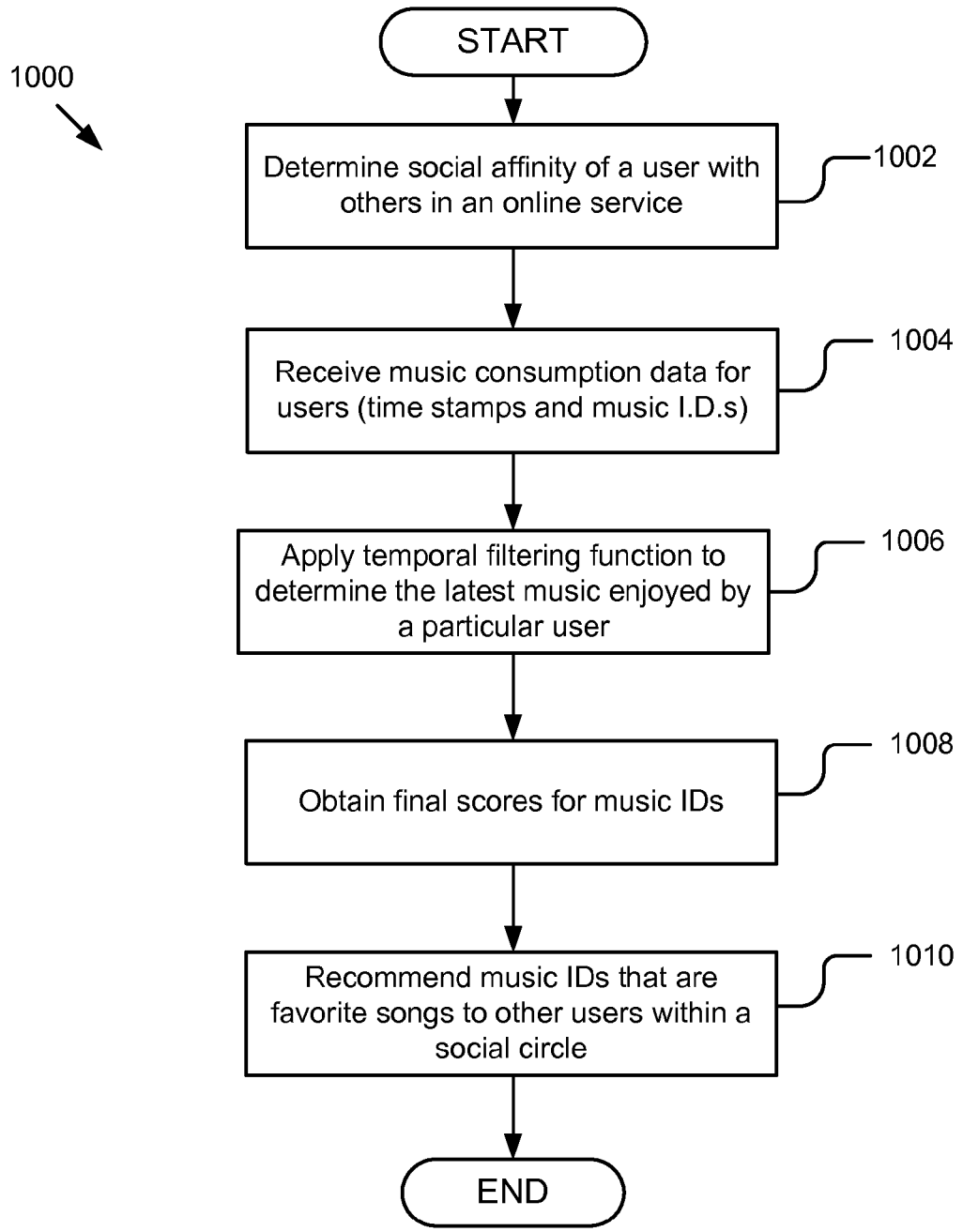
FIG. 10 is a flow chart illustrating a method for detecting temporal music trends by using the filter engine.

FIG. 10 is a flow chart illustrating a method for detecting temporal music trends by using the temporal filter engine 218 (FIG. 2B). The method begins at bock 1002 with determining a social affinity of a user (any of the users 132a through 132h in the social graphs illustrated in FIG. 3, 4, 8) with other users in a social circle as described in detail above. In some embodiments described above, the social affinity determination server 110 and the social affinity designation engine 110a are configured to make such determinations. The method continues at block 1004, at which point, music consumption data for the various users (any or all of the users including users 132a through 132h used here as examples) is received, via the various ways and from the various sources described in detail above. The temporal trends detection engine 216a (FIG. 2B) compiles this music consumption data. The method continues at the next block 1006, at which point, the method applies a temporal filtering function via the temporal filter engine 218 (FIG. 2B) to determine the "latest" or "popular" music enjoyed by a particular user (any one or all of the user examples illustrated here). The algorithms used by the temporal filtering function are described in detail above with reference to FIG. 5. The method continues at block 1008, at which point, the temporal trends detection engine 216a obtains final scores for each of the music identifiers. A review of these final scores reveals music identifiers that are mostly recently consumed. The method continues at block 1010, where the current trend recommendation engine 220 generates recommendations for users with the music identifiers with the highest scores, indicating "favorite" songs of a specific user. The current trend recommendation engine 220 generates recommendations and transmits them to other users in a social circle, either by posting on other user accounts or in the other ways that are described above.

Figure 10A:
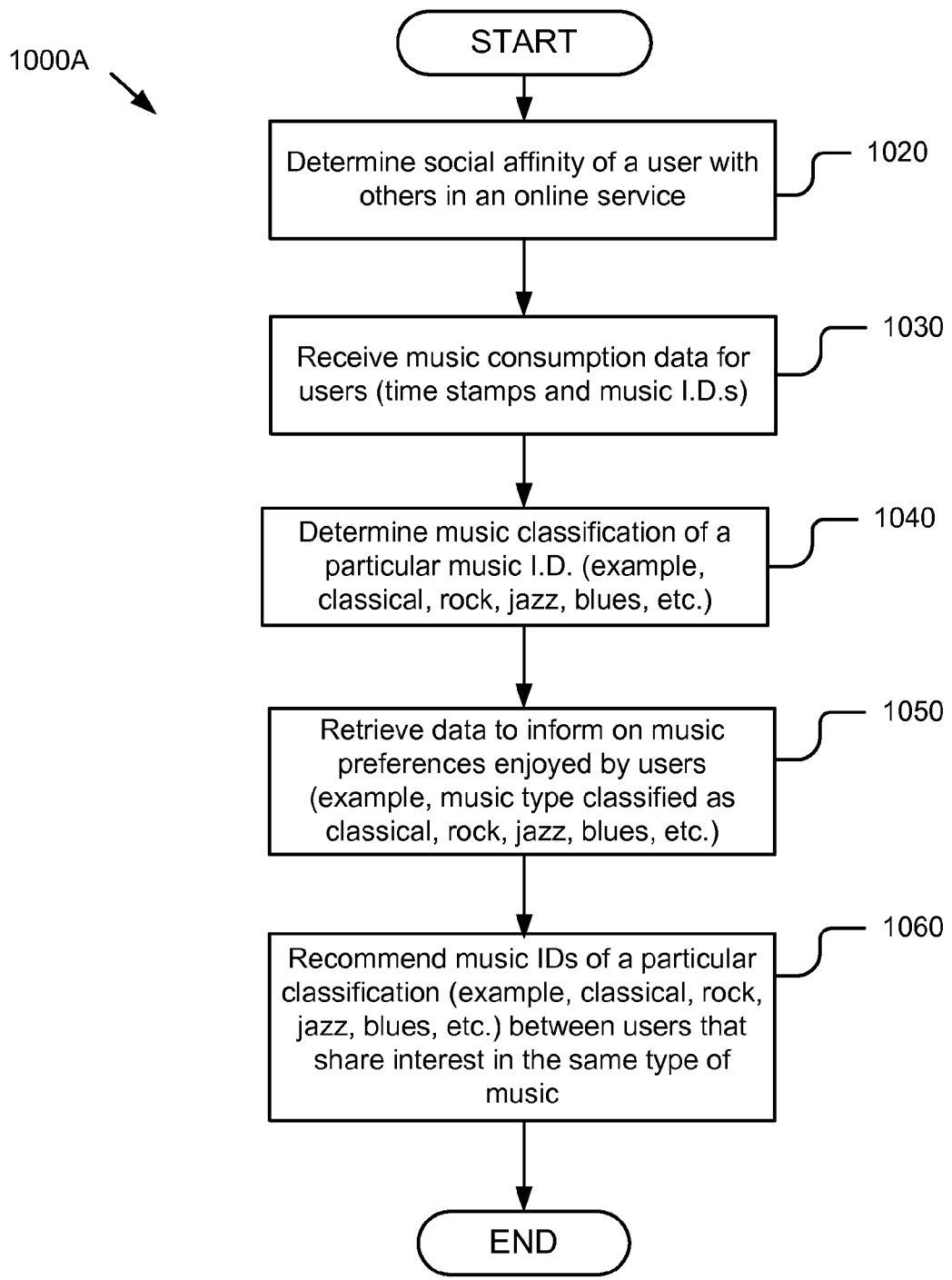
FIG. 10A is a flow chart illustrating a method for determining social affinity based on a particular item of music and its type.

FIG. 10A is a flow chart illustrating a method by which the social affinity determination server 110 determines social affinity of a particular user with other users in an online service based on an item of music. The method begins at block 1020 and proceeds to step 1030 where music consumption data (time stamps and music I.D.s) for users is received. The method proceeds to block 1040, at which point, the music classification of a particular music I.D. (for example, classical, rock, jazz, blues, etc.) is determined. The method proceeds to step 1050, at which point, data is retrieved, which informs the system on music preferences enjoyed other users (for example, music type classified as classical, rock, jazz, blues etc.). The method proceeds to block 1060, at which point, recommendations are generated for users or between users that share interest in the same type of music. In the event, users have more than one music preferences, only selections of music of interest to a user, based on the classification are recommended. For example, a user may enjoy classical, but not rock, therefore, only selections of classical music are recommended.

Figure 11:
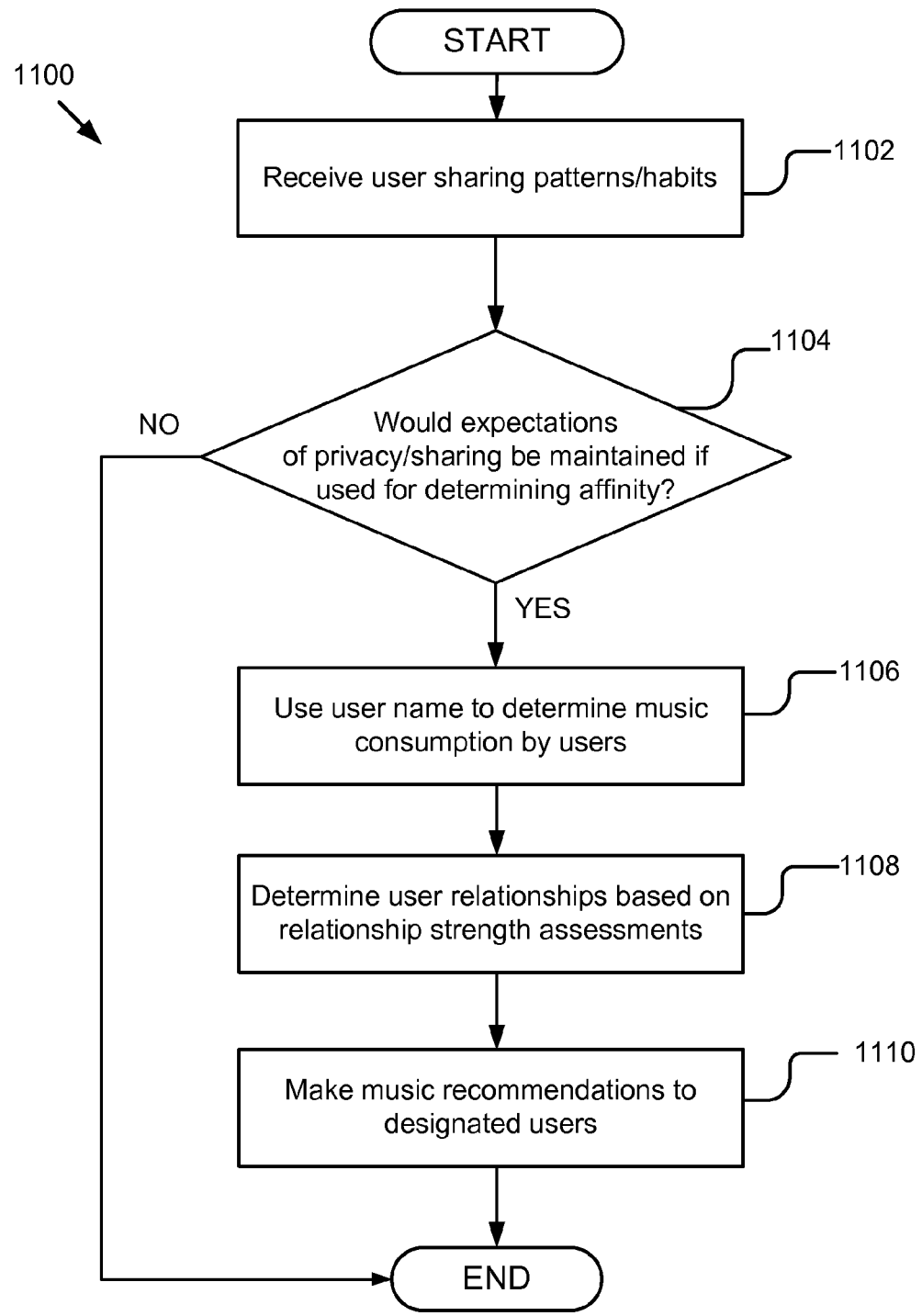
FIG. 11 is a flow chart illustrating a method for detecting user affinity and sharing habits.

FIG. 11 is a flow chart illustrating a method for detecting user affinity and sharing habits. The method starts at block 1102, wherein according to some embodiments of the method, the temporal trends detection engine 216a (FIG. 2C) receives user sharing habits for users. The method proceeds to the next block, which is a decision block 1104, with a query to ensure that expectations of privacy/sharing are maintained if user information is used for determining affinity. If the answer to this decision block in no, the method proceeds to an end. If the answer is yes, the method proceeds to the next block 1106, where user names are used to determine and track music consumption habits for the users. For example, music consumption patterns for any one of more of the users 132a through 132h may be determined by the user name. With reference to FIG. 4, for user 132a, the method may use the user name "Jenny" to determine her music consumption patterns. The method then proceeds to block 1108, where the social affinity designation engine 110a determines levels of user relationships based on strength assessments, either according to the coding illustrated in FIG. 6 or the coding illustrated in FIG. 7. The method proceeds to block 1110, wherein music tastes and interests of one user (for example user 1320 are shared with other users (132e, 132h, and 132g) in the user's social circle of friends.

Figure 12:
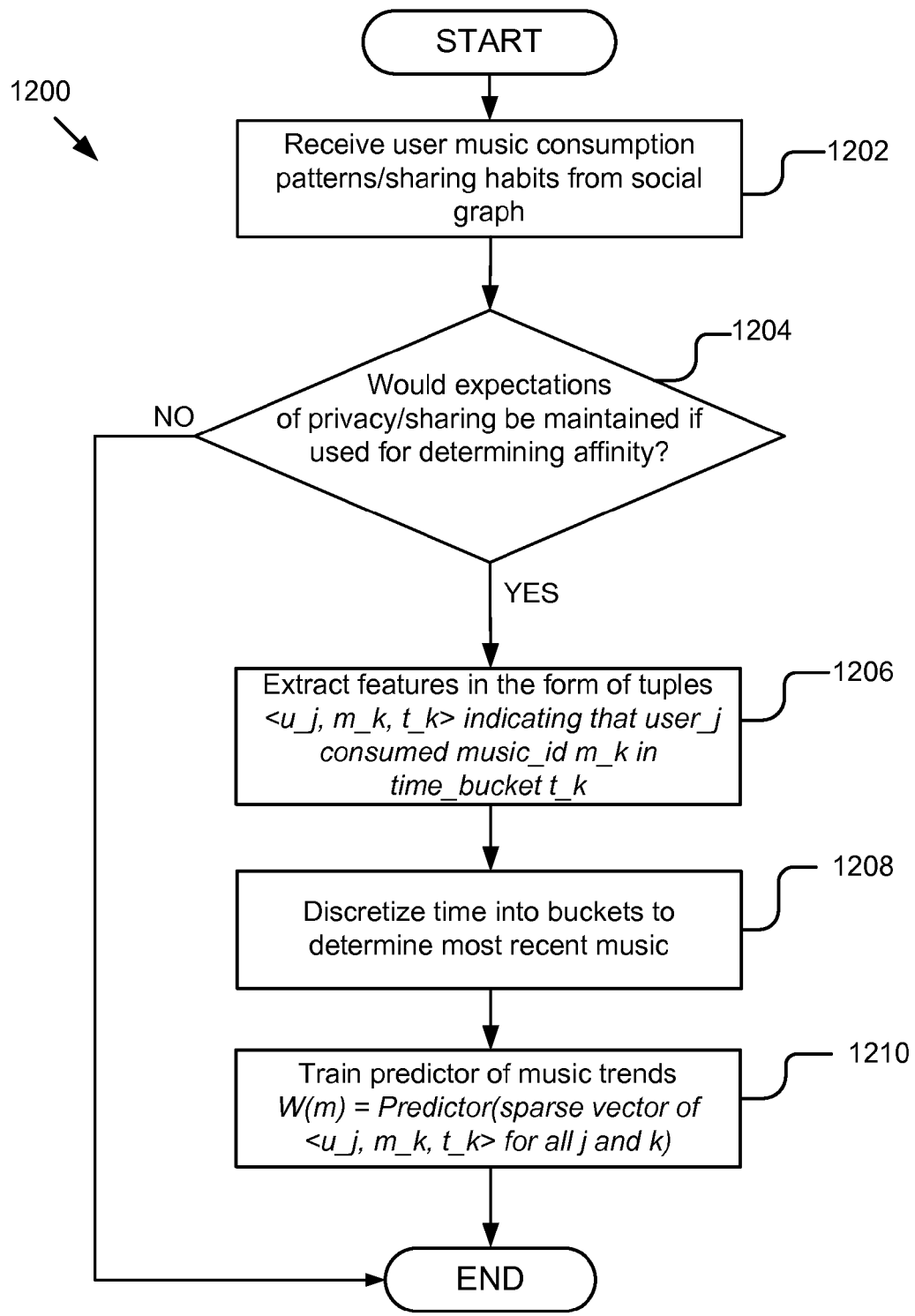
FIG. 12 is a flow chart of a method for detecting temporal music trends by using the predictor engine.

FIG. 12 is a flow chart of a method for detecting temporal music trends by using the predictor engine 222. The method begins and proceeds to block 1202 wherein the temporal trends detection engine receives music consumption and sharing habits from a user's social graph. The method presents a decision block 1204 with a query inquiring if expectations of privacy/sharing would be maintained if used for determining affinity. If the answer is negative, the method proceeds to the end. If the answer is affirmative, the method proceeds to the next block 1206, at which point, the predictor engine 222 derives features in the form of tuples <u_j, m_k, t_k> indicating that user_j (any one of example users 132a through 132h) consumed music_i d m_k in time_bucket t_k. The method proceeds to the next block 1208, at which point, the temporal trends detection engine 216a compiles the tuples for various users and discretizes the time stamps into different buckets to determine the most recent music consumed, for example, in the last minute, the last hour, the last day, etc. Again, the most recent time stamps are accorded the highest weight and the time stamps farthest back in time are accorded the lowest weight. The method proceeds to the next block 1210, at which point, with this information, the system trains its predictor engine 222 to apply the algorithm W(m)=Predictor(sparse vector of <u_j, m_k, t_k> for all j and k).

The foregoing description of the embodiments of the present technology has been presented for the purposes of illustration and description. It is not intended to be exhaustive or to limit the present technology to the precise form disclosed. Many modifications and variations are possible in light of the above teaching. It is intended that the scope of the present technology be limited not by this detailed description, but rather by the claims of this application. As should be understood by those familiar with the art, the present technology may be embodied in other specific forms, without departing from the spirit or essential characteristics thereof. Likewise, the particular naming and division of the modules, routines, features, attributes, methodologies, and other aspects are not mandatory or significant, and the mechanisms that implement the present invention or its features may have different names, divisions and/or formats. Furthermore, as should be apparent to one of ordinary skill in the relevant art, the modules, routines, features, attributes, methodologies and other aspects of the present technology can be implemented as software, hardware, firmware, or any combination of the three. Also, wherever a component, an example of which is a module, of the present technology is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the present technology is in no way limited to implementation in any specific programming language, or for any specific operating system or environment. Accordingly, the disclosure of the present technology is intended to be illustrative, but not limiting, of the scope of the present invention, which is set forth in the following claims.

What is claimed is:

1. A computer-implemented method for detecting temporal music trends in an online community, executing on one or more computing devices, the method comprising:

identifying a type of music for a particular user based on activities of the particular user inside and outside the online community;

determining, by at least one of the one or more computing devices, users of the online community that share a common interest in the type of music with the particular user;

obtaining, by at least one of the one or more computing devices, music consumption data for the users that share the common interest in the type of music with the particular user, wherein the music consumption data includes a plurality of items of music having the type of music, and timestamps that indicate when and how many times each one of the plurality of items of music was consumed by the users, the plurality of items of music identified by unique music identifiers;

compiling a list of the plurality of items of music consumed by the users that share the common interest in the type of music with the particular user, the list of the plurality of items of music including the time stamps that indicate when and how many times each of the plurality of items of music was consumed by the users;

determining, from the list, one or more popular items of music that are popular based on the time stamps that indicate when and how many times the one or more popular items of music were consumed by the users;

determining a strength of a social affinity between the users and the particular user based on interactions between the users and the particular user in the online community;

generating recommendations, by at least one of the one or more computing devices, for the particular user, including transmitting the recommendations for the particular user from the users that share the common interest in the type of music with the particular user based on the strength of the social affinity between the particular user and the users, and reconfiguring the recommendations for display to the particular user by determining real-time popular items that are popular based on time stamps; and providing for display to the particular user the generated recommendations.

2. The computer-implemented method of claim 1, further comprising:

formulating an assessment code index with a coding scheme to designate different types of relationships between users of the online community including the particular user.

3. The computer-implemented method of claim 2, further comprising:

determining the strength of the social affinity, based at least in part, on the assessment code index, wherein the assessment code index has different designations for different types of relationships.

4. The computer-implemented method of claim 2, further comprising:

formulating a binary code to designate if the recommendations should be transmitted from other users of the online community to the particular user; and generating the strength of the social affinity, based at least in part, on the assessment code index, wherein the assessment code index designates a first code to designate sharing between users that share the social affinity with the particular user and a second code to designate no sharing between users that do not share the social affinity with the particular user.

5. A system for detecting temporal music trends in an online community, comprising one or more computing devices, the system comprising:

a social affinity designation engine for identifying a type of music for a particular user based on activities of the particular user inside and outside the online community, determining other users of the online community that share a common interest in the type of music with the particular user, and determining a strength of a social affinity that the other users share with the particular user based on interactions between the other users and the particular user in the online community;

a temporal trends detection engine for obtaining music consumption data for the particular user, wherein the music consumption data includes a plurality of items of music having the type of music, and timestamps that indicate when and how many times each one of the plurality of items of music was consumed by the particular user, the plurality of items of music identified by unique music identifiers;

a temporal filter engine for compiling a list of the plurality of items of music consumed by the particular user, the list of the plurality of items of music including the time stamps; and a current trends recommendation engine for determining, from the music consumption data, one or more popular items of music that are popular based on the time stamps that indicate when and how many times the one or more popular items of music were consumed by the particular user, and for generating recommendations to share the one or more popular items of music, based at least in part, on the strength of the social affinity between the particular user and the other users within the online community.

6. The system of claim 5, wherein the current trends recommendation engine is configured for transmitting the recommendations from the particular user to the other users, based at least in part, on determining the strength of the social affinity between the other users and the particular user, and is configured to reconfigure the recommendations for display to the particular user by determining real-time popular items that are popular based on the time stamps.

7. The system of claim 5, wherein the social affinity designation engine formulates an assessment code index with a coding scheme to designate different types of relationships between the other users of the online community and the particular user.

8. The system of claim 7, wherein the social affinity designation engine determines the strength of the social affinity, based at least in part, on the assessment code index, wherein the assessment code index has different designations for different types of relationships.

9. The system of claim 7, wherein the social affinity designation engine formulates a binary code to designate if the recommendations should be transmitted from the particular user to the other users of the online community and generates the strength of the social affinity, based at least in part, on the assessment code index, wherein the assessment code index designates a first code to designate sharing between the particular user and the other users that share the social affinity with the particular user and a second code to designate no sharing between the other users that do not share the social affinity with the particular user.

10. A system for generating recommendations of music for an online service, comprising:

a social affinity engine for identifying a type of music for a particular user based on activities of the particular user inside and outside the online service, determining other users of the online service that share a common interest in the type of music with the particular user, and determining a strength of a social affinity between the other users of the online service with the particular user based on interactions between the particular user and the other users of the online service;

a detection engine for compiling music consumption data for the particular user of the online service, by using a user name to obtain one or more features from the music consumption data for the particular user, wherein the music consumption data includes a plurality of items of music having the type of music, and timestamps that indicate when and how many times an item of music from the plurality of items of music was consumed by the particular user, each of the plurality of items of music having a unique music identifier;

a predictor engine for retrieving the music consumption data including the unique music identifiers and the time stamps that indicate when and how many times an item of music was consumed by the particular user to determine, from the music consumption data, a popular item of music that is popular; and a recommendation engine for automatically generating one or more recommendations of music from the particular user for the other users of the online service based on the popular item of music and the strength of the social affinity between the particular user and the other users.

11. A computer program product comprising a non-transitory computer useable medium including a computer readable program, wherein the computer readable program when executed on a computer causes the computer to:
    identify, by one or more computing devices within the computer, a type of music for a particular user based on activities of the particular user inside and outside an online service;
    determine, by the one or more computing devices within the computer, other users of the online service that share a common interest in the type of music with the particular user;
    compile, by the one or more computing devices within the computer, in a local storage, music consumption data for the particular user of the online service, wherein the music consumption data includes one or more items of music having the type of music, and timestamps that indicate when and how many times each of the one or more items of music was consumed by the particular user, each of the one or more items of music having a unique music identifier;
    retrieve the music consumption data including unique music identifiers and the time stamps that indicate when and how many times each of the one or more items of music was consumed by the particular user;
    determine, from the music consumption data, one or more popular items of music that meet a designated criteria, the criteria including a designation of times at which the one or more popular items of music were consumed, and meeting the designation of times indicating that the one or more popular items are popular;
    determine, by the one or more computing devices within the computer, a strength of a social affinity between the particular user and the other users based on interactions between the particular user and the other users of the online service; and
    generate one or more recommendations from the particular user to other users within the online community based on the one or more popular items of music and the strength of the social affinity between the other users of the online service and the particular user;
    transmit the one or more recommendations for display from the particular user to the other users based on the strength of the social affinity between them;
    reconfigure the recommendations for display to the particular user by determining real-time popular items that are popular based on the time stamps; and
    provide for display to the particular user the reconfigured recommendations.

12. The computer-program product of claim 11, further comprising:
    formulating an assessment code to designate varying types of relationships between the particular user and the other users of the online service; and
    generating the strength of the social affinity, based at least in part, on the assessment code wherein the assessment code has different designations for different types of relationships.

13. A computer-implemented method for generating a user interface comprising:
    identifying, by at least one of one or more computing devices, a type of music for a particular user based on activities of the particular user inside and outside an online service;
    determining, by at least one of the one or more computing devices, other users of the online service that share a common interest in the type of music with the particular user;
    compiling, by at least one of the one or more computing devices, in a local storage, music consumption data for the particular user of the online service, wherein the music consumption data includes one or more items of music having the type of music, and timestamps that indicate when and how many times each of the one or more items of music was consumed by the particular user, each of the one or more items of music having a unique music identifier;
    retrieving the music consumption data including unique music identifiers and the time stamps that indicate when and how many times each of the one or more items of music was consumed by the particular user;
    determining, from the music consumption data, one or more popular items of music that meet a designated criteria, the criteria including a designation of times at which the one or more popular items of music were consumed, and meeting the designation of times indicating that the one or more popular items are popular;
    determining, by at least one of the one or more computing devices, a strength of a social affinity between the particular user and the other users based on interactions between the particular user and the other users of the online service;
    generating recommendations to the other users of the online service based on the one or more popular items of music and the strength of the social affinity between the other users of the online service and the particular user;
    transmitting the recommendations for the particular user from the other users that share the common interest in the type of music with the particular user, based on determining the strength of the social affinity between the users and the particular user;
    reconfiguring the recommendations for display to the particular user by determining real-time popular items that are popular based on the time stamps; and
    providing for display to the particular user the reconfigured recommendations.

14. A computer-implemented method for generating a user interface according to claim 13, wherein the strength of the social affinity between the particular user and the other users is determined based on an assessment code that is formulated to designate varying types of relationships between the particular user and the other users.

15. A computer-implemented method for generating a user interface according to claim 13, wherein the timestamps indicate at least one of a time of day, week, month, or year.

* * * * *